United States Patent
Boduch et al.

(10) Patent No.: US 7,274,701 B2
(45) Date of Patent: Sep. 25, 2007

(54) CELL BASED WRAPPED WAVE FRONT ARBITER (WWFA) WITH BANDWIDTH RESERVATION

(75) Inventors: Mark E Boduch, Geneva, IL (US); David Rancich, Naperville, IL (US)

(73) Assignee: Tellabs Operations, Inc., Naperville, IL (US)

(*) Notice: Subject to any disclaimer, the term of this patent is extended or adjusted under 35 U.S.C. 154(b) by 1097 days.

(21) Appl. No.: 10/287,259

(22) Filed: Nov. 4, 2002

(65) Prior Publication Data

US 2004/0085967 A1    May 6, 2004

(51) Int. Cl.
*H04L 12/28* (2006.01)
*H04L 12/56* (2006.01)

(52) U.S. Cl. .................... 370/395.4; 370/412
(58) Field of Classification Search ............. None
See application file for complete search history.

(56) References Cited

U.S. PATENT DOCUMENTS

| | | | |
|---|---|---|---|
| 5,299,190 | A | 3/1994 | LaMaire et al. |
| 5,734,649 | A | 3/1998 | Carvey et al. |
| 6,023,471 | A | 2/2000 | Haddock et al. |
| 6,044,061 | A | 3/2000 | Aybay et al. |
| 6,072,772 | A | 6/2000 | Charny et al. |
| 6,359,861 | B1 | 3/2002 | Sui et al. |
| 6,430,181 | B1 | 8/2002 | Tuckey |
| 6,735,212 | B1 * | 5/2004 | Calamvokis ............ 370/412 |
| 6,856,622 | B1 * | 2/2005 | Calamvokis et al. ...... 370/390 |
| 2003/0231593 | A1 * | 12/2003 | Bauman et al. ............. 370/235 |

FOREIGN PATENT DOCUMENTS

| | | |
|---|---|---|
| CA | 2 306 042 | 10/2000 |
| EP | 1 193 922 | 4/2002 |

OTHER PUBLICATIONS

Chi et al., "Decomposed Arbiters for Large Crossbars with Multi-Queue Input Buffers", Proceedings of the International Conference on Computer Design, Cambridge, Massachusetts, Oct. 1991.

(Continued)

*Primary Examiner*—Huy D. Vu
*Assistant Examiner*—Clemence Han
(74) *Attorney, Agent, or Firm*—Jung-hua Kuo

(57) ABSTRACT

Systems and methods for cell based wrapped wave front arbiter (WWFA) with bandwidth reservation are disclosed. The method for reserving bandwidth of a given priority using the WWFA for arbitrating bandwidth among virtual links between input and output ports, each virtual link supporting one or more priorities and corresponding to an arbitration unit (AU) of the WWFA generally comprises performing at least one arbitration pass of a wave front of the WWFA where AUs having a reserved bandwidth request of a given priority and reserved bandwidth credit of the given priority compete for the bandwidth associated with the wave front, and where AUs not having a reserved bandwidth request of the given priority and reserved bandwidth credit of the given priority do not compete for the bandwidth, and performing at least one subsequent arbitration pass where AUs having a reserved bandwidth request of the given priority compete for the bandwidth.

34 Claims, 19 Drawing Sheets

OTHER PUBLICATIONS

Anderson, et al., "High Speed Switch Sceduling for Local Area Networks", Proceedings of the Fifth International Conference on Architectural Support for Programming Languages and Operating Systems (ASPLOS V), Oct. 1992.

Tamir et al., "Symmetric Crossbar Arbiters for VLSI Communication Switches", IEEE Transaction On Parallel and Distributed Systems, vol. 4, No. 1, 1993.

Stiliadis et al, "Providing Bandwidth Guarantees in an Input-Buffered Crossbar Switch", Computer Engineering Department, University of California, Santa Cruz, California, Aug. 1994.

Tamir et al., "Symmetric Crossbar Arbitors for VLSI Communication Switches", IEEE Transactions on Parallel and Distributed Systems, Jan. 1993, pp. 13-27, vol. 4, No. 1, IEEE Inc., New York, NY, USA.

* cited by examiner

Wave Front Initiated at Stage 0 (Cell Period 0)

Wave Front Initiated at Stage 1 (Cell Period 1)

Wave Front Initiated at Stage 2 (Cell Period 2)

Wave Front Initiated at Stage 0 (Pass 1)

Wave Front Passed From Stage 2 Back to Stage 0 (Pass 2)

Arbitration Unit Supporting Bandwidth Reservation

Fixed Point Credit Generator

| Credit Spacing Range in Cell Periods | | Percentage of Link Bandwidth ($BW^{P}_{i,j} \times 100$) | Weight Register Range of Values (Binary) ($\tilde{S}$) |
|---|---|---|---|
| Decimal Range | Binary Range ($S$) | | |
| 0 to 0.96875 | 000000000000000.00000 to 000000000000000.11111 | No Bandwidth | 111111111111111.11111 to 111111111111111.00000 |
| 1 to 1.96875 | 000000000000001.00000 to 000000000000001.11111 | 100% to 50.794% | 111111111111110.11111 to 111111111111110.00000 |
| 2 to 3.96875 | 000000000000010.00000 to 000000000000011.11111 | 50% to 25.197% | 111111111111101.11111 to 111111111111100.00000 |
| 4 to 7.96875 | 000000000000100.00000 to 000000000000111.11111 | 25% to 12.549% | 111111111111011.11111 to 111111111111000.00000 |
| 8 to 15.96875 | 000000000001000.00000 to 000000000001111.11111 | 12.5% to 6.262% | 111111111110111.11111 to 111111111110000.00000 |
| 16 to 31.96875 | 000000000010000.00000 to 000000000011111.11111 | 6.25% to 3.128% | 111111111101111.11111 to 111111111100000.00000 |
| 32 to 63.96875 | 000000000100000.00000 to 000000000111111.11111 | 3.125% to 1.5633% | 111111111011111.11111 to 111111111000000.00000 |
| 64 to 127.96875 | 000000001000000.00000 to 000000001111111.11111 | 1.5625% to 0.7814% | 111111110111111.11111 to 111111110000000.00000 |
| 128 to 255.96875 | 000000010000000.00000 to 000000011111111.11111 | 0.7813% to 0.3907% | 111111101111111.11111 to 111111100000000.00000 |
| 256 to 511.96875 | 000000100000000.00000 to 000000111111111.11111 | 0.39063% to 0.1953% | 111111011111111.11111 to 111111000000000.00000 |
| 512 to 1023.96875 | 000001000000000.00000 to 000001111111111.11111 | 0.1953% to 0.0977% | 111110111111111.11111 to 111110000000000.00000 |
| 1024 to 2047.96875 | 000010000000000.00000 to 000011111111111.11111 | 0.0977% to 0.0488% | 111101111111111.11111 to 111100000000000.00000 |
| 2048 to 4095.96875 | 000100000000000.00000 to 000111111111111.11111 | 0.0488% to 0.0244% | 111011111111111.11111 to 111000000000000.00000 |
| 4096 to 8191.96875 | 001000000000000.00000 to 001111111111111.11111 | 0.0244% to 0.0122% | 110111111111111.11111 to 110000000000000.00000 |
| 8192 to 16383.96875 | 010000000000000.00000 to 011111111111111.11111 | 0.0122% to 0.0061% | 101111111111111.11111 to 100000000000000.00000 |
| 16384 to 32767.96875 | 100000000000000.00000 to 111111111111111.11111 | 0.0061% to 0.0031% | 011111111111111.11111 to 000000000000000.00000 |

Table for Fixed Point Credit Generator

FIG. 12

| Credit Spacing Range in Cell Periods | | Percentage of Link Bandwidth $(BW^p_{i,j} \times 100)$ | Programmed Weight Register Range of Values | |
|---|---|---|---|---|
| Decimal Range | Binary Range | | Exponent (Binary) | Mantissa (Binary) |
| 1 to 1.96875 | 1.00000 to 1.11111 | 100% to 50.794% | 0000 | 11111 to 00000 |
| 2 to 3.9375 | 10.0000 to 11.1111 | 50% to 25.397% | 0001 | 11111 to 00000 |
| 4 to 7.875 | 100.000 to 111.111 | 25% to 12.698% | 0010 | 11111 to 00000 |
| 8 to 15.75 | 1000.00 to 1111.11 | 12.5% to 6.349% | 0011 | 11111 to 00000 |
| 16 to 31.5 | 10000.0 to 11111.1 | 6.25% to 3.175% | 0100 | 11111 to 00000 |
| 32 to 63 | 100000 to 111111 | 3.125% to 1.587% | 0101 | 11111 to 00000 |
| 64 to 126 | 1000000 to 1111110 | 1.563% to 0.794% | 0110 | 11111 to 00000 |
| 128 to 252 | 10000000 to 11111100 | 0.781% to 0.397% | 0111 | 11111 to 00000 |
| 256 to 504 | 100000000 to 111111000 | 0.391% to 0.198% | 1000 | 11111 to 00000 |
| 512 to 1008 | 1000000000 to 1111110000 | 0.195% to 0.0992% | 1001 | 11111 to 00000 |
| 1024 to 2016 | 10000000000 to 11111100000 | 0.0977% to 0.0496% | 1010 | 11111 to 00000 |
| 2048 to 4032 | 100000000000 to 111111000000 | 0.0488% to 0.0248% | 1011 | 11111 to 00000 |
| 4096 to 8064 | 1000000000000 to 1111110000000 | 0.0244% to 0.0124% | 1100 | 11111 to 00000 |
| 8192 to 16128 | 10000000000000 to 11111100000000 | 0.0122% to 0.0062% | 1101 | 11111 to 00000 |
| 16384 to 32256 | 100000000000000 to 111111000000000 | 0.0061% to 0.0031% | 1110 | 11111 to 00000 |
| 32768 to 64512 | 1000000000000000 to 1111110000000000 | No Bandwidth | 1111 | 11111 to 00000 |

Table for Floating Point Credit Generator

FIG. 14

| Pass | High priority queue, b/w credit | Low priority queue, b/w credit | High priority queue, no b/w credit | Low priority queue, no b/w credit | |
|---|---|---|---|---|---|
| 1 | Eligible | Not eligible | Not eligible | Not eligible | ~ 272 |
| 2 | Eligible | Eligible | Not eligible | Not eligible | ~ 274 |
| 3 | Eligible | Eligible | Eligible | Not eligible | ~ 276 |
| 4 | Eligible | Eligible | Eligible | Eligible | ~ 278 |

FIG. 17

3 by 3 Switch with Buffers

| Buffer Accumulation Counter Operation |||||
|---|---|---|---|
| South Signal #1 (Counter_Control 1) | South Signal #0 (Counter_Control 0) | Grants Issued | Counter Action |
| Activated | Activated | 0 | Decrement Counter |
| Activated | Deactivated | 1 | no action |
| Deactivated | Activated | 1 | no action |
| Deactivated | Deactivated | 2 | Increment Counter |

Output Port (column) Arbiter Speedup Control

CELL BASED WRAPPED WAVE FRONT ARBITER (WWFA) WITH BANDWIDTH RESERVATION

BACKGROUND OF THE INVENTION

1. Field of the Invention

The present invention relates generally to a cell based switch fabric. More specifically, a system and method for a cell based wrapped wave front arbiter (WWFA) with bandwidth reservation are disclosed.

2. Description of Related Art

In a network, various network stations such as computers are connected such as by a central network communication hub or a network communication switch. A network hub is simply a repeater that receives a data packet from any one network station and broadcasts or repeats the data packet to all the network stations to which it is connected. Each data packet contains a header to indicate the intended destination station for the packet and each network station receives the packet and examines the packet header to determine whether to accept or ignore the packet. One disadvantage of the hub is that the connection between each network station and the hub carries all packets broadcast by the hub, including not only packets directed to that network station but also packets directed to all other network stations.

In contrast, a network switch routes an incoming packet only to the intended destination station of the packet so that each network station receives only the packet traffic directed to it such that network switches are capable of handling multiple packet transmission concurrently. A network switch generally has input and output ports for receiving and transmitting packets from and to network stations and a switching mechanism to selectively route each incoming packet from an input port to the appropriate output port. The input port typically stores an incoming packet, determines the destination output port from the routing data included in the packet header, and then arbitrates for a switch connection between the input port and the destination output port. When the connection is established, the input port sends the packet to the output port via the switch.

A key component of interconnection networks is n×n switches. Interconnection networks that provide high bandwidth, low latency interprocessor communication enable multiprocessors and multicomputers to achieve high performance and efficiency. It is important for the n×n communication switches to have efficient internal architecture to achieve high performance communication.

A typical communication switch includes n input ports, n output ports, an n×n crossbar switching mechanism, and buffer memory. The communication switch receives packets arriving at its input ports and routes them to the appropriate output ports. The bandwidth of the input ports is typically equal to the bandwidth of the output ports.

However, there may be conflicting demands for resources such as buffer space or output ports resulting in delays in the traffic through switches. For example, when two packets destined for the same output port arrive at the input ports of the switch simultaneously, the packets cannot both be forwarded and at least one is buffered.

Because input ports may receive competing connection requests, a network communication switch typically provides an arbitration system for determining the order requests are granted in order to resolve conflicting resource demands and to provide efficient and fair scheduling of the resources in order to increase performance in interconnection networks.

The arbitration system may include an arbiter that receives connection requests from the input ports, monitors the busy status of the output ports, and determines the order that pending requests are granted when an output port becomes idle. When a request is granted by the arbiter, the arbiter transmits an acknowledgment to the corresponding input port, and may transmit control data to the switching mechanism to cause the switch to make the desired connection between the input and output ports. Upon receiving the acknowledgment, the input port transmits the data to the output port via the switching mechanism. The central arbiter typically assigns a priority level to each input and/or output port. The arbiter may, for example, rotate input and output port priority in order to fairly distribute connection rights over time.

An arbiter may employ a crossbar switching mechanism to allow arbitrary permutations in connecting the input buffers and/or inputs to output ports. An n×n crossbar has n horizontal buses (rows), each connected to an input buffer, and n vertical buses (columns), each connected to an output port. A horizontal bus intersects a vertical bus at a crosspoint where there is a switch that can be closed to form a connection between the corresponding input buffer and output port.

The design and implementation of various crossbar arbiters are discussed in Tamir and Chi, "Symmetric Crossbar Arbiters for VLSI Communication Switches," IEEE Transactions on Parallel and Distributed Systems, Vol. 4, No. 1, 1993, pp. 13-27, the entirety of which is incorporated by reference herein. Tamir discloses a centralized wave front arbiter for an n×n crosspoint switch routing data between n network stations. The arbiter includes an n×n array of arbitration units (which Tamir refers to as cells), one for each possible connection of the crosspoint switch. Each input port corresponds to one row of arbitration units and supplies a separate request signal to each arbitration unit of the row. Each output port corresponds to one column of arbitration units and supplies a separate busy signal to each arbitration unit of the column. The arbitration units are ranked according to priority. When an input port seeks a connection to an output port it asserts the one of n output request signals. The asserted request signal drives the arbitration unit in the column corresponding to the output port. That arbitration unit grants a request when not otherwise inhibited from doing so by a higher priority arbitration unit. Priority is periodically shifted from arbitration unit to arbitration unit using token passing rings to provide equitable allocation of connection rights to both input and output ports.

FIG. 1 illustrates an exemplary communication switch 50 that supports three input ports 58 and three output ports 60. The communication switch 50 includes a 3×3 crossbar switching mechanism 52, a 3×3 arbiter 54, and a set of nine virtual output queues 56. Each path from a given input port i 58 to a given output port j 60 can be referred to as a virtual link $VL_{ij}$. In a communication switch supporting a single service (queuing) priority, there is one virtual output queue $Q_{ij}$ 56 associated with each virtual link $VL_{ij}$. Information that is to be transferred to output port j 60 arriving at input port i 58 is temporarily stored in virtual output queue $Q_{ij}$ 56. Since the communication switch 50 shown switches fixed length packets, referred to as cells, information arriving at the communication switch 50 is converted into cells prior to being stored in a corresponding virtual output queue.

A cell period is associated with the communication switch 50. During a given cell period, one cell may be transferred to each of the three output ports 60 from the virtual output queues 56. The three by three crossbar switching mechanism 52 is used to perform this transfer. As shown, the three by three crossbar switching mechanism 52 includes nine switch units ($SU_{0,0}$ through $SU_{2,2}$) arranged in a three by three matrix. A given switch unit $SU_{ij}$ is used to transfer the contents of virtual queue $Q_{ij}$ to output port j, thereby establishing virtual link $VL_{ij}$. Thus, switch unit $SU_{ij}$ is dedicated to the establishment of virtual link $VL_{ij}$.

The switches within the crossbar 52 may be reconfigured every cell period, such that during each cell period, a maximum of three cells are able to be transferred from the virtual output queues to the three output ports (one cell per output port). Based upon the construction of the crossbar switching mechanism shown, during any given cell period, only one cell may be transferred from a given input port, and only one cell may be transferred to a given output port. Otherwise, two cells would conflict with one another within the switching mechanism. It follows then that during any given cell period, only one switch within any given column of the crossbar matrix may be closed, and (for the non-broadcast case) only one switch within any given row of the crossbar matrix may be closed. For example, if the switches in both switch unit $SU_{0,0}$ and switch unit $SU_{2,0}$ were closed simultaneously, then neither the cell from input port 0 or input port 2 would be successfully transferred to output port 0. Thus, a maximum of three crossbar switches may be closed within the three by three crossbar matrix 52 during any given cell period.

It is the responsibility of the three by three arbiter 54 to determine which three crossbar switches are closed during any given cell slot period. In essence, the arbiter 54 attempts to "match" three input ports to three output ports during each cell period. As is evident from FIG. 1, each virtual output queue $Q_{ij}$ has an associated switch unit $SU_{ij}$ and an associated arbitration unit $AU_{ij}$. If a given virtual output queue $Q_{ij}$ contains at least one cell, then the corresponding request signal $R_{ij}$ is activated at its corresponding arbitration unit $AU_{ij}$. During every cell period, the arbiter 54 examines all the activated requests and selects up to three non-conflicting crossbar switch settings. The three selected crossbar switches are then closed and, by activating the corresponding Grant $G_{ij}$ signals, the three corresponding virtual output queues are granted permission to transfer a cell. Once the cells are transferred to the output ports, the process is then repeated during the following cell period.

The arbiter shown in FIG. 1 may be implemented as a wave front arbiter (as described in Tamir) in order to make its selections. FIG. 2 is a block diagram of an exemplary 3×3 wave front arbiter 60. In its simplest implementation, priority is given based upon arbitration unit location. In such an implementation, arbitration units above have higher priority than arbitration units below, and arbitration units to the left have higher priority than arbitration units to the right.

Each arbitration unit of the 3×3 arbiter 60 has a top (North) and a left (West) input. When deactivated, the top input of an arbitration unit indicates that the output port of the associated column has been granted to some other input port during the current cell period, while the left input, when deactivated, indicates that the input port of the associated row has been matched to some other output port during the current cell period. If either the top input or the left input of a given arbitration unit is deactivated, then that arbitration unit will not issue a grant for that cell period. If the top input, the left input, and the request signal are all activated at a given arbitration unit, then that arbitration unit will issue a grant for that cell period.

In the 3×3 arbiter 60, the top left arbitration unit has the highest priority and thus the arbitration process starts at $AU_{0,0}$. Since the top and left inputs of arbitration unit $AU_{0,0}$ are permanently activated, if request signal $R_{0,0}$ is activated, grant signal $G_{0,0}$ will be activated and $AU_{0,0}$'s bottom (South) and right (East) output signals will be deactivated, thus indicating that input 0 and output 0 are no longer available for matching. If request signal $R_{0,0}$ is deactivated, then $AU_{0,0}$'s bottom and right output signals will be activated, thus indicating to the diagonally downstream arbitration units that input 0 and output 0 are available for matching. After arbitration unit $AU_{0,0}$ finishes its processing, its bottom and right output signals are forwarded to arbitration units $AU_{0,1}$ and $AU_{1,0}$, and a similar process is performed at each of those two arbitration units. Likewise, once $AU_{0,1}$ and $AU_{1,0}$ finish their processing, their output signals are forwarded to arbitration units $AU_{0,2}$, $AU_{1,1}$, and $AU_{2,0}$.

As is evident, the order of processing of input information within the arbiter can be likened to a wave front moving diagonally from the top left arbitration unit down to the bottom right arbitration unit. When the bottom right arbitration unit finishes its processing, then the arbitration cycle for that cell period has been completed. For the 3×3 wave front arbiter 60, the wave front moves through the arbiter in five steps. At each step, each arbitration unit can independently perform its processing since at each step no two arbitration units share the same input row or output column.

The simple wave front arbiter 60 shown in FIG. 2 distributes bandwidth unfairly since the top left arbitration unit will always receive as much bandwidth as it needs and the other arbitration units receive decreasing amounts of bandwidth depending upon their physical relationship relative to the top left arbitration unit. Tamir somewhat rectifies this situation by rotating the top priority from one arbitration unit to another over some period of time. Rotating priority has the effect of distributing bandwidth to each virtual link equally. However, in real world applications, all virtual links do not typically require the same amount of bandwidth and for such applications the wave front arbiter with rotating priority still does not distribute bandwidth fairly.

As noted by Tamir, it is possible to decrease the processing time of the overall arbitration cycle by utilizing a "wrapped" wave front arbiter. A wrapped wave front arbiter can be formed from a wave front arbiter by feeding the bottom outputs of the bottom row arbitration units into the top inputs of the top row arbitration units, and similarly feeding the right outputs of the rightmost column arbitration units into the left inputs of the leftmost column of arbitration units. In an n×n wrapped wave front arbiter, n arbitration units that do not share a common row or a common column within the arbiter can be grouped together to form an arbitration stage. FIG. 3 is a block diagram of a 3×3 wrapped wave front arbiter 64 with three arbitration stages. As can be observed, arbitration units $AU_{0,0}$, $AU_{2,1}$, and $AU_{1,2}$ can be grouped into one stage (stage 0), since none of these arbitration units share a common input row or output column. Similarly, arbitration units $AU_{0,1}$, $AU_{1,0}$, and $AU_{2,2}$ can be grouped into another common stage (stage 1) and arbitration units $AU_{0,2}$, $AU_{1,1}$, and $AU_{2,0}$ can be grouped into yet another common stage (stage 2). In an n×n wrapped wave front arbiter, all n arbitration units within a given stage simultaneously process their input signals. Once one stage has completed its processing, the arbitration wave front moves to the next stage, and the n arbitration units of that next stage process their input signals. This continues until the arbitration units of all stages complete their processing. As is evident, an n×n wrapped wave front arbiter requires only n steps to complete its processing. This is less than the 2n−1 steps required for the n×n wave front arbiter of FIG. 2.

In a wrapped wave front arbiter with fixed stage priority, one stage is declared to have priority over all other stages, and therefore during each cell period the n arbitration units of that highest priority stage always process their inputs first. For instance, if stage 0 is declared to have the highest priority in the arbiter 64 shown in FIG. 3, then the arbitration units of stage 0 process their inputs at the start of each arbitration cycle, and then forward their outputs to the arbitration units of stage 1. Once the arbitration units of stage 1 finish processing their inputs, the stage 1 arbitration units forward their outputs to the arbitration units of stage 2. After the arbitration units of stage 2 finish processing their inputs, the arbitration cycle is complete.

A wrapped wave front arbiter with fixed stage priority also distributes bandwidth unfairly since the arbitration units associated with the highest priority stage always receive as much bandwidth as they want, and the arbitration units of the other stages receive decreasing amounts of bandwidth depending upon their physical relationship to the highest priority stage. Tamir once again somewhat rectifies this situation by rotating the top priority from one stage to another over some period of time. As was the case for the wave front arbiter with rotating priority, rotating stage priority within the wrapped wave front arbiter (as shown in FIG. 4) has the effect of distributing bandwidth to each virtual link equally. However, as noted previously, in real world applications, virtual links typically do not all require the same amount of bandwidth, and for such applications, the wrapped wave front arbiter with rotating stage priority will not distribute bandwidth fairly.

In order to gain an understanding of how a wrapped wave front arbiter may distribute bandwidth unfairly, consider the following case. Assume that all the virtual output queues in the FIG. 3 system contain an unlimited number of cells (i.e., there is constantly backlogged traffic). In such a situation, all nine request signals $R_{ij}$ will always be activated, as each virtual link will attempt to garner as much bandwidth as possible. Assume also that stage priority is rotated every cell period, such that stage 0 has the highest priority during cell period 0, stage 1 has the highest priority during cell period 1, stage 2 has the highest priority during cell period 2, etc. (as illustrated in FIGS. 4A-4C). In this situation, virtual links $VL_{0,0}$, $VL_{2,1}$, and $VL_{1,2}$ will be granted one cell of bandwidth during cell period 0, virtual links $VL_{0,1}$, $VL_{1,0}$, and $VL_{2,2}$ will be granted one cell of bandwidth during cell period 1, virtual links $VL_{0,2}$, $VL_{1,1}$, and $VL_{2,0}$ will be granted one cell of bandwidth during cell period 2, etc. Thus it can be observed that each of the three virtual links that desire the bandwidth of a given output port will receive exactly $\frac{1}{3}^{rd}$ of the bandwidth of that port.

Now assume that the three virtual links associated with stage 0 (i.e., $VL_{0,0}$, $VL_{2,1}$, and $VL_{1,2}$) no longer have any cells in their associated virtual output queues, while the virtual output queues associated with the other two stages still contain an unlimited amount of cells. In this situation, when an arbitration wave front is initiated at stage 0 during cell period 0, none of the arbitration units associated with stage 0 will claim bandwidth, and therefore the wave front will pass on to the stage 1 arbitration units. Since the virtual links associated with stage 1 desire unlimited bandwidth, the bandwidth associated with the stage 0 initiated wave front is granted to the three "stage 1" virtual links. Following the arbitration cycle associated with cell period 0, an arbitration wave front is initiated at stage 1 during cell period 1, and the bandwidth associated with that wave front is also granted to the three virtual links associated with the stage 1 arbitration units. During cell period 2, an arbitration wave front is initiated at stage 2, and the bandwidth associated with that wave front is granted to the three virtual links associated with the stage 2 arbitration units. As can be observed, the three virtual links associated with stage 1 unfairly garner $\frac{2}{3}$rds of the bandwidth of the output ports, while the three virtual links associated with stage 2 garner only $\frac{1}{3}^{rd}$ of the bandwidth of the output ports.

In the example, the stage 1 virtual links benefit from the fact that the stage 1 arbitration units are physically located downstream from the stage 0 arbitration units, while the stage 2 virtual links suffer from the fact that the stage 2 arbitration units are not physically located downstream from the stage 0 arbitration units. It should be noted that the effects illustrated above can be somewhat mitigated by randomizing the application of the requests to the arbiter. However, randomizing the application of the requests to the arbiter further complicates the communication switch while still not providing a mechanism for allocating bandwidth in a flexible manner. For instance, in the previous example, there may be a desire to allocate $\frac{3}{5}$ths of the output bandwidth to the virtual links associated with stage 2 and $\frac{2}{5}$ths of the bandwidth to the virtual links associated with stage 1. Randomizing the application of the requests to the arbiter does not address this problem.

Several schemes have been proposed to allocate bandwidth through a crossbar switch using a variety of methods. Static scheduling is discussed in T. Anderson, S. Owicki, J. Saxe, and C. Thacker, "High Speed Switch Scheduling for Local Area Networks," Proc. Fifth International Conference on Architectural Support for Programming Languages and Operating Systems (ASPLOS V), October 1992, pp. 98-110 (also appeared in ACM Transactions on Computer Systems 11, 4, November 1993, pp. 319-352 and as Digital Equipment Corporation Systems Research Center Technical Report #99); weighted probabilistic iterative matching is discussed in D. Stiliadis and A. Varma, "Providing Bandwidth Guarantees in an Input-Buffered Crossbar Switch" Proceedings of INFOCOM'95, Boston, Mass., April 1995, and matching using weighted edges is discussed in A. Kam and K. Siu, "Linear Complexity Algorithms for QoS Support in Input-queued Switches with no Speedup," IEEE Journal on Selected Areas in Communications, June 1999, vol. 17, (no. 6):1040-56.

In Anderson, a scheduling frame with a fixed number of slots is defined, and bandwidth is statically allocated to input/output pairs (i.e., virtual links) by manually configuring a table. The table, which spans the period of time associated with the scheduling frame, is then used to reconfigure the switch fabric every cell period. The pattern associated with reconfiguring the switch fabric repeats itself every scheduling frame period. There are two potential problems associated with the static scheduling method presented by Anderson: 1) reconfiguring the tables is complex and time consuming and thus may limit the connection establishment rate associated with the switch, and 2) bandwidth may go unused during reserved slots where connections have no data available.

In Stiliadis, an input/output matching algorithm is presented that uses two passes through the arbiter per cell period. During the first pass, only those virtual links that have "bandwidth credits" are allowed to compete for bandwidth, while during the second pass, those virtual links with and without bandwidth credit are allowed to compete for bandwidth. A frame period is defined, and each virtual link is given an amount of bandwidth credits at the start of each frame period. Once a given virtual link runs out of credits, it can no longer compete for bandwidth during the first pass through the arbiter. There are three potential problems associated with Stiliadis's algorithm: 1) an iterative matching algorithm is used and therefore the implementation of the algorithm might be considered more complex than the implementation of the simple wrapped wave front arbiter algorithm, 2) credits are issued to each virtual link at the start of each frame period associated with the arbiter and therefore (as discussed by Stiliadis) bursty connections may increase the delay of other connections through the associated switch, and 3) the algorithm does not allow connections with low delay requirements (and reserved bandwidth) to take priority over connections with no delay requirements (and reserved bandwidth).

In Kam, a method of matching inputs to outputs using weighted virtual links is presented. Kam uses a matching algorithm (the Central Queue Algorithm) that matches inputs to outputs in sequential order based upon weights that are attached to each input/output pair. Since each match is performed sequentially starting with the highest weighted pair, when applied to a switch with n inputs, the algorithm may require $n^2$ steps to complete. (It should be noted that the wrapped wave front arbiter requires a maximum of n steps to complete its matches, since it attempts to match n pairs in parallel at each step. Furthermore, as pointed out in H. Chi and Y. Tamir "Decomposed Arbiters for Large Crossbars with Multi-Queue Input Buffers," Proceedings of the International Conference on Computer Design, Cambridge, Mass., October 1991, pp. 233-238, the wrapped wave front arbiter may be easily pipelined, and therefore practical wrapped wave front arbiters can be constructed for switches containing large values of n.) Kam also presents an algorithm that uses two passes through the arbiter per cell period. In the first pass, those input/output pairs with credits are allowed to compete for bandwidth, while during the second pass all the input/output pairs without credit are allowed to compete for bandwidth. In addition, Kam offers a method of giving higher precedence to those input/output pairs requiring lower delay guarantees by rescaling the credit weights. There are two potential problems associated with Kam's algorithms: 1) the long arbitration cycle associated with the Central Queue Algorithm may make it impractical to implement when the number of inputs is large, and 2) all of the algorithms presented in Kam require a sorting process (of varying complexity) prior to performing the matching algorithm, thus adding to the complexity of the overall implementation.

U.S. Pat. Nos. 6,430,181, 6,044,061, and 6,072,772 also describe various other arbitration mechanisms which also suffer from many of the drawbacks discussed above such as complex sorters, sequential matching algorithms, elements of unfairness, etc.

An example of an arbiter is a wrapped wave front arbiter. Unlike some conventional arbiters, a wrapped wave front arbiter is simple to implement and therefore offers an attractive and practical method of performing arbitration within a communication switch. However, for cases where all input ports are not requesting bandwidth on all output ports, the wrapped wave front arbiter does not resolve conflicting resource demands in a fair manner. Conventionally, the unfairness problem is addressed by under-utilizing the switch fabric or by providing switch fabric speedup. However, these options are not ideal and may not be able to be incorporated into certain systems. In addition, conventional wave front arbiters do not guarantee the proportional amounts of bandwidth to inputs and outputs of a switch fabric when nonuniform traffic patterns are applied to the switch inputs.

Thus, it is desirable to provide a wave front arbiter that addresses the unfairness problem associated with conventional wave front arbiters and/or allows bandwidth reservation within a wave front arbiter-based switch fabric.

SUMMARY OF THE INVENTION

A system and method for a cell based wrapped wave front arbiter (WWFA) with bandwidth reservation are disclosed. The system allows bandwidth to be reserved within a wave front arbiter based switch fabric. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

As previously described, the path that information follows from a given input port to a given output port can be referred to as a virtual link. The method for reserving bandwidth of a given priority using the WWFA for arbitrating bandwidth among virtual links between input and output ports, each virtual link supporting one or more priorities and corresponding to an arbitration unit of the WWFA generally comprises performing at least one arbitration pass of a wave front of the WWFA where arbitration units having a reserved bandwidth request of a given priority and reserved bandwidth credit of the given priority compete for the bandwidth associated with the wave front, and where arbitration units not having a reserved bandwidth request of the given priority and reserved bandwidth credit of the given priority do not compete for the bandwidth, and performing at least one subsequent arbitration pass where arbitration units having a reserved bandwidth request of the given priority compete for the bandwidth.

In one preferred embodiment each virtual link supports a high priority and a low priority such that the WWFA performs four passes. During the first arbitration pass, only arbitration units having high priority reserved bandwidth credit and a high priority bandwidth request compete for the bandwidth associated with the wave front. During the second arbitration pass, arbitration units having high priority reserved bandwidth credit and a high priority bandwidth request and arbitration units having low priority reserved bandwidth credit and a low priority bandwidth request compete for the bandwidth. During the third arbitration pass, arbitration units having a high priority bandwidth request and arbitration units having low priority reserved bandwidth credit and a low priority bandwidth request compete for the bandwidth. During the fourth arbitration pass, arbitration units having at least one bandwidth request compete for the bandwidth associated with the wave front.

Priority within a given arbitration unit is preferably determined as follows. A high priority bandwidth request with a high priority reserved bandwidth credit has priority for the bandwidth over a low priority bandwidth request with a low priority reserved bandwidth credit, if the low priority bandwidth request with low priority reserved bandwidth credit is eligible to compete for the bandwidth. A low priority bandwidth request with a low priority reserved bandwidth credit has priority for the bandwidth over a high priority bandwidth request without high priority reserved bandwidth credit, if the high priority bandwidth request without high priority reserved bandwidth credit is eligible to compete for the bandwidth. A high priority bandwidth request without high priority reserved bandwidth credit has priority for the bandwidth over a low priority bandwidth request without low priority reserved bandwidth credit, if the low priority bandwidth request without low priority reserved bandwidth credit is eligible to compete for the bandwidth.

Each priority of each virtual link may be associated with a bandwidth credit accumulator register indicating the level of remaining reserved bandwidth credit, if any, a reserved bandwidth weight register for programming a predetermined level of reserved bandwidth, a request counter register for tracking the number of bandwidth requests, a rate counter register that is periodically incremented to generate reserved bandwidth credits for the bandwidth credit accumulator register, and an optional burst register having a predetermined value for limiting the maximum value of the bandwidth credit accumulator register.

The rate counter register can be periodically incremented depending upon the value of the weight register. When the rate counter register reaches a predetermined value, a bandwidth credit is generated for the bandwidth credit accumulator register and the rate counter is reset. In addition, when a bandwidth credit is generated, the bandwidth credit accumulator is incremented if the bandwidth credit accumulator register is less than a predetermined maximum bandwidth credit accumulator value and (i) if the request counter register is greater than or equal to the value of the bandwidth credit accumulator register where the burst register is not employed or (ii) if the value of the request counter register plus the value of the burst register is greater than the value of the bandwidth credit accumulator register where the burst register is employed.

A reserved bandwidth credit generator may be employed to generate the bandwidth credit. The reserved bandwidth credit generator can be a floating point or a fixed point reserved bandwidth credit generator and the generator preferably includes the rate counter register and the reserved bandwidth weight register.

The switching mechanism associated with the WWFA may buffer an output for a virtual link corresponding to the arbitration unit granted bandwidth as a result of the bandwidth arbitration passes, if any. The output is buffered into an output buffering queue associated with the output port corresponding to the virtual link. With output buffering queues, the WWFA may grant more than one request for bandwidth for an output port as a result of the bandwidth arbitration passes of a given wave front, where at most one granted request for each output port is for transfer to the output port and any non-transferred granted request is for buffering in the output buffering queue. Where each virtual link supports multiple priorities and where each output port is associated with multiple output buffering queues each associated with one of the priorities, the WWFA can schedule buffered outputs from the output queues to each output port.

According to another preferred embodiment, a communications switch with bandwidth reservation generally comprises a WWFA with bandwidth reservation to arbitrate bandwidth of a given priority among the virtual links between input and output ports associated with the WWFA, each virtual link supporting one or more priorities corresponding to an arbitration unit of the WWFA. The WWFA is configured to perform at least one bandwidth arbitration pass of a wave front of the WWFA where arbitration units having a reserved bandwidth request of a given priority and reserved bandwidth credit of the given priority compete for the bandwidth associated with the wave front, and where arbitration units not having a reserved bandwidth request of the given priority and reserved bandwidth credit of the given priority do not compete for the bandwidth associated with the wave front and to perform at least one subsequent bandwidth arbitration pass of the wave front wherein arbitration units having a reserved bandwidth request of the given priority compete for the bandwidth associated with the wave front.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 12 is a table listing the range of bandwidths that can be allocated with the credit generator of FIG. 11;

FIG. 14 is a table showing the range of bandwidths that can be allocated with the credit generator of FIG. 13;

FIG. 17 is a table listing the four passes associated with each wave front and the corresponding components of the virtual link that are eligible to compete for the bandwidth associated with the wave front;

DESCRIPTION OF SPECIFIC EMBODIMENTS

A system and method for a cell based wrapped wave front arbiter (WWFA) with bandwidth reservation are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Communication Switch: Crossbar and Arbiter

Figure 5:
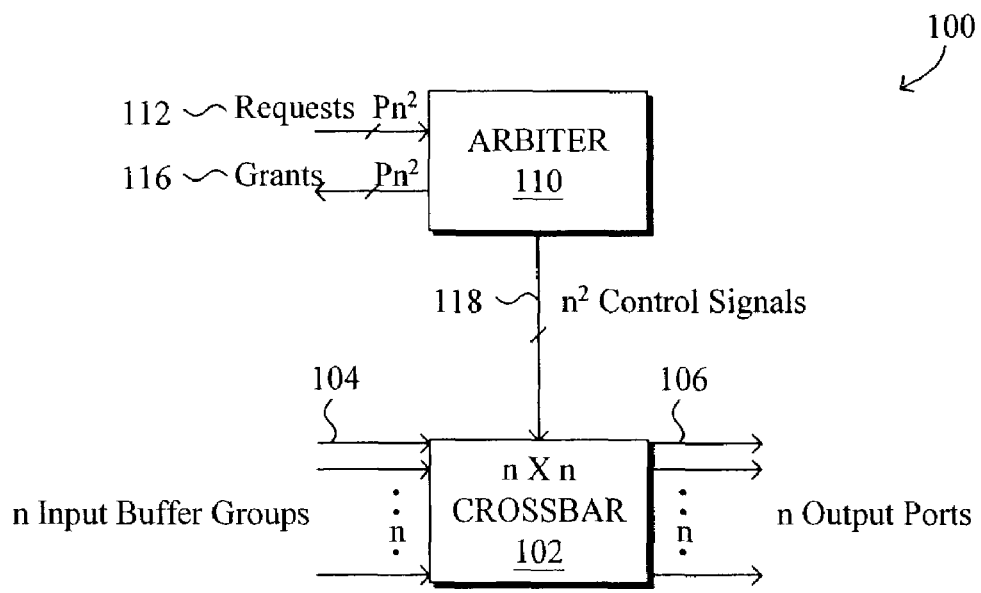
FIG. 5 is a block diagram illustrating a communication switch having an n×n crossbar and an arbiter.

FIG. 5 is a block diagram illustrating a communication switch 100 having an n×n crossbar 102 and an arbiter 110. The n×n crossbar 102 has n horizontal buses (rows) and n vertical buses (columns). Each horizontal bus is connected to a corresponding input buffer group 104 and each vertical bus is connected to a corresponding output port 106. Each crossbar bus is a resource or server and thus the n×n crossbar 102 has 2n resources: n internal crossbar buses for the n input buffers and n internal crossbar buses for the n output ports.

In a system supporting P service priorities (i.e., queuing priorities) there are Pn virtual output queues associated with each input buffer group: one queue for each service priority of each of the n output ports. Therefore, there are a total of $Pn^2$ virtual output queues contained within the entire system. Each horizontal bus intersects n vertical buses and each vertical bus intersects n horizontal buses. A crosspoint is where a horizontal bus intersects a vertical bus. There is a switch at each crosspoint that may be closed to form a connection between the corresponding horizontal and vertical buses to connect the corresponding input buffer group 104 to the corresponding output port 106. The n×n crossbar 102 thus enables arbitrary connections of input buffers 104 to output ports 106. The n×n switches of the crossbar 102 are controlled by the arbiter 110 via $n^2$ control signals 118 generated by the arbiter 110.

Inputs to the arbiter 110 include $Pn^2$ request lines 112 corresponding to the $n^2$ crosspoints of the crossbar 102 and n output ports 106. A request line 112 is asserted when the user or service of the corresponding crosspoint is requested.

The outputs from the arbiter includes $Pn^2$ grant lines 116 that indicate which crosspoint requests (and which priority) have been granted and $n^2$ control lines that connect or disconnect the crosspoints in the crossbar 102. In particular, the $n^2$ control lines connect the crosspoints in the crossbar 102 for which the corresponding crosspoint requests have been granted and disconnect all other crosspoints in the crossbar 102.

Arbitration is among a matrix of requests 112, each request for a crosspoint of the crossbar. The arbiter 110 arbitrates among the requests so that at most one grant is given to a given row of the matrix and at most one grant is given to a given column of the matrix.

Wrapped Wave Front Arbiter (WWFA)

Figure 6:
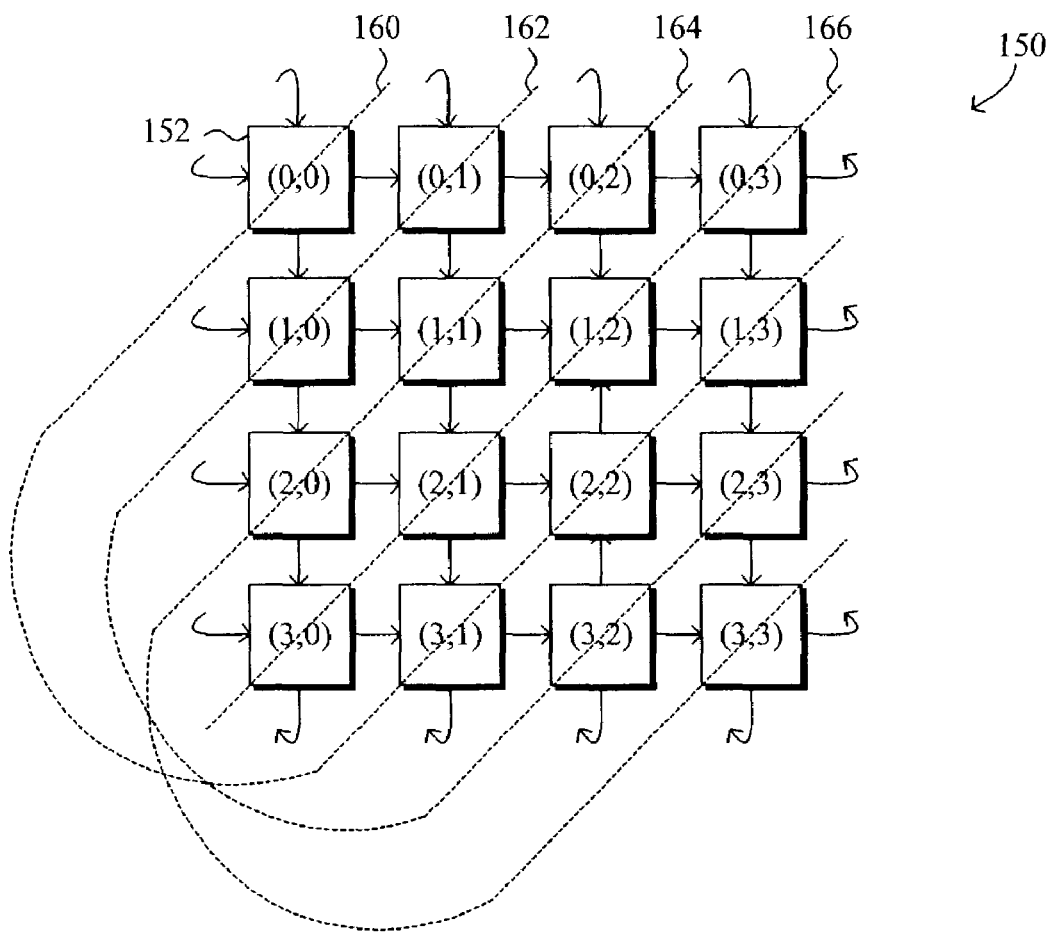
FIG. 6 is a block diagram illustrating a 4×4 WWFA.

FIG. 6 is a block diagram illustrating a 4×4 wrapped wave front arbiter (WWFA) 150. The arbiter 150 includes 4×4 or 16 arbitration cells or units 152. Each unit 152 represents a crosspoint. Wrapped wave front refers to the mechanism used to indicate the top priority arbitration units during the arbitration process. With the WWFA, the arbiter 150 has n or four wrapped diagonals 160, 162, 164, and 166 each containing n or four arbitration units 152. In particular, wrapped diagonal 160 includes arbitration units 152 labeled (0,0), (1,3), (2,2), and (3,1). Wrapped diagonal 162 includes arbitration units 152 labeled (0,1), (1,0), (2,3), and (3,2). Wrapped diagonal 164 includes arbitration units 152 labeled (0,2), (1,1), (2,0), and (3,3). Lastly, wrapped diagonal 166 includes arbitration units 152 labeled (0,3), (1,2), (2,1), and (3,0). The n crosspoints of any given wrapped diagonal of the arbitration array are guaranteed not to conflict because all the crosspoints of the wrapped diagonal are on different rows and different columns.

A single n bit circular shift register may be used to indicate the wrapped diagonal (or stage) containing the top priority crosspoints. In one preferred embodiment, the progression of the arbitration wave front moves from left to right, i.e., through wrapped diagonals 160, 162, 164, and 166.

If an arbitration unit performs its operations in T time units, the WWFA 150 processes each stage of arbitration of the wrapped diagonal of n crosspoints after T time units. The WWFA 150 thus completes the arbitration, i.e., the outputs of all arbitration units 152 of the WWFA 150 are stable in their final values, in nT time units.

WWFA with Bandwidth Reservation

The WWFA reserves bandwidth for each virtual link (VL) where a virtual link links an input buffer to an output port and corresponds to an arbitration unit. With bandwidth reservation, a given VL receives its reserved bandwidth as needed. However, during time periods where a given VL is not utilizing its entire reserved bandwidth, the unused bandwidth is preferably redistributed to other VLs in order to achieve higher link utilization and greater efficiency. Thus, because a given VL may instantaneously require more bandwidth than what is reserved for it within the WWFA, any non-reserved link bandwidth is distributed to VLs that can utilize it.

The arbitration unit contains support for high priority and low priority queues. For a given queuing priority (i.e., service priority), a WWFA with reserved bandwidth is preferably implemented using a two-pass wave front arbiter. Each wave front injected into the WWFA represents one cell worth of bandwidth on each of the n output ports. On a wave front's first pass through the arbiter, only those arbitration units that have bandwidth credit and a bandwidth request compete for the bandwidth associated with the wave front. On a wave front's second pass through the arbiter, all arbitration units with at least one bandwidth request compete for the bandwidth associated with the wave front. Thus, with two queuing priorities, four passes are made through the WWFA. Given the wrap around structure of the WWFA it should be readily apparent to those skilled in the art that a multipass arbiter (as discussed in the previously referenced papers of both Stiliadis and Kam) can be implemented by simply recirculating a wave front through the WWFA multiple times. In their 1993 paper (referenced above), Tamir and Chi provides a method for excluding arbitration units from claiming the bandwidth associated with a wave front by the use of a signal which blocks a request from being recognized. Therefore, Tamir and Chi provide a mechanism which allows only selective arbitration units to participate in a given arbitration pass.

Figure 7A:
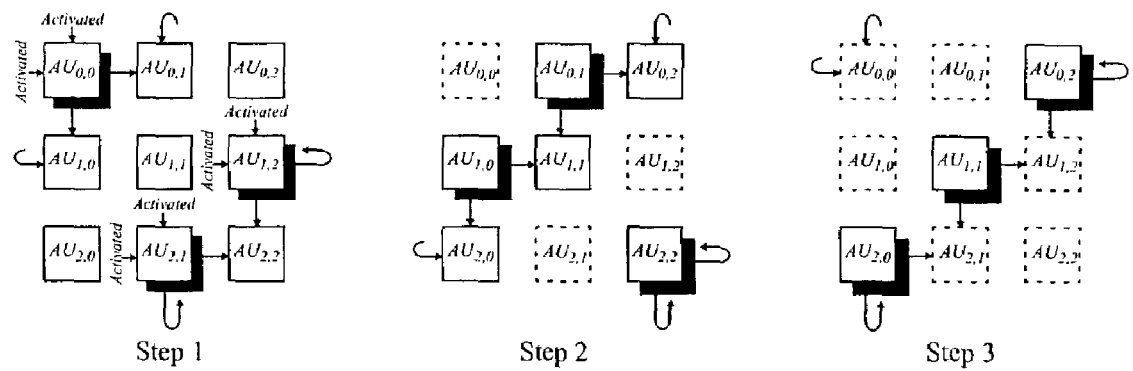
FIGS. 7A and 7B are block diagrams illustrating the flow of a single wave front through a two pass 3×3 WWFA.
Figure 7B:
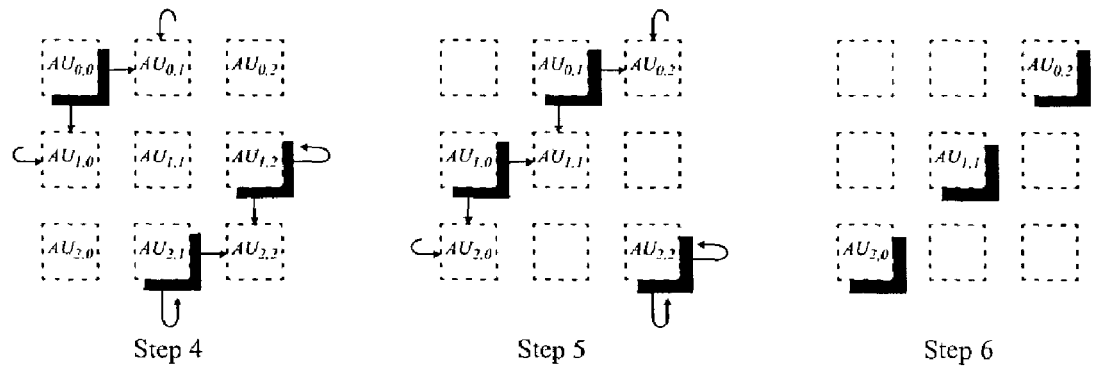

FIGS. 7A and 7B are block diagrams illustrating the flow of a single wave front through a two pass 3×3 WWFA. In step 1, a wave front is initiated at stage 0 of the WWFA. The wave front then passes to stage 1 in step 2, and stage 2 in step 3. During steps 1, 2, and 3, only those arbitration units with bandwidth credit and a bandwidth request can claim the bandwidth associated with the wave front. The output information from the stage 2 arbitration units in step 3 is passed back to the stage 0 arbitration units during step 4. The wave front then passes again through stages 1 and 2 during steps 5 and 6. During steps 4, 5, and 6, any arbitration unit with a request can claim any unclaimed bandwidth associated with the wave front. Once the wave front exits stage 2 during step 6, the arbitration cycle is complete for the cell period associated with the wave front that was initiated at step 1. At this point, a new wave front would be initiated at stage 1, as previously illustrated in FIGS. 4A-4C. If in FIG. 7A arbitration unit $AU_{1,1}$ had a credit and a pending request, and all eight other arbitration units had pending requests but no credits, then arbitration unit $AU_{1,1}$ would be granted one cell of bandwidth at step 3, $AU_{0,0}$ would be granted one cell of bandwidth at step 4, and $AU_{2,2}$ would be granted one cell of bandwidth at step 5.

The above description assumed that a wave front could propagate through all three stages twice during a single cell period. However, performance can be improved by partitioning the arbiter array into sub-arrays (such as noted in Chi and Tamir, reference above). For such a case, if the arbiter is partitioned into S sub-arrays, the overall arbiter can process S wave fronts simultaneously in a pipeline like manner. In one possible embodiment, an n×n arbiter array can be partitioned into n sub-arrays. For such a case, the arbiter array simultaneously processes n wave fronts. In a single pass arbiter, if each wave front is processed in one clock cycle at each arbitration unit, and there is one clock cycle per cell period, then each wave front requires n clock cycles to completely propagate through the n×n arbiter. In a similar manner, using four clock cycles per cell period, a four-pass arbiter can be constructed such that each wave front requires 4n clock periods, or n cell periods to completely propagate through the n×n arbiter. This allows each arbitration unit one clock period to completely perform its required processing associated with a given wave front of a given pass through the arbiter, and, once properly pipelined, allows the arbiter to generate up to n grants every cell period.

In the preferred embodiment, each VL has four components: a high priority reserved bandwidth component, a low priority reserved bandwidth component, a high priority non-reserved bandwidth component, and a low priority non-reserved bandwidth component. Each of these components approximately corresponds to one pass through the WWFA.

During periods of high congestion, each VL is preferably guaranteed to obtain its two reserved bandwidth components and optionally no more than the reserved bandwidth. During periods of low congestion, some VLs may be able to obtain bandwidth beyond their reserved bandwidth with higher priority components being given access to the excess bandwidth before lower priority components.

The total amount of reserved bandwidth on any given input link or any given output link should be restricted to some value less than the total bandwidth available on a given input or output link. Assuming a system with P service priorities, n inputs, and n outputs, let $BW^P_{i,j}$ represent the bandwidth fraction reserved for the $p^{th}$ priority of virtual link $VL_{i,j}$. Then the reserved bandwidth on any given input link i should be restricted according to the inequality, $$\sum_{j=0}^{n-1}\sum_{p=1}^{P} BW^p_{i,j} < 1 \text{ for all } i,$$

and the reserved bandwidth on any given output link j should be restricted according to the inequality, $$\sum_{i=0}^{n-1}\sum_{p=1}^{P} BW^p_{i,j} < 1 \text{ for all } j.$$

For example, in a 3×3 system with two service priorities, $$BW^1_{0,0}+BW^1_{0,1}+BW^1_{0,2}+BW^2_{0,0}+BW^2_{0,1}+BW^2_{0,2}<1;$$

i.e., the bandwidth reserved for virtual links $VL_{0,0}$, $VL_{0,1}$, and $VL_{0,2}$ should be less than the total amount of bandwidth on input link 0.

Figure 8:
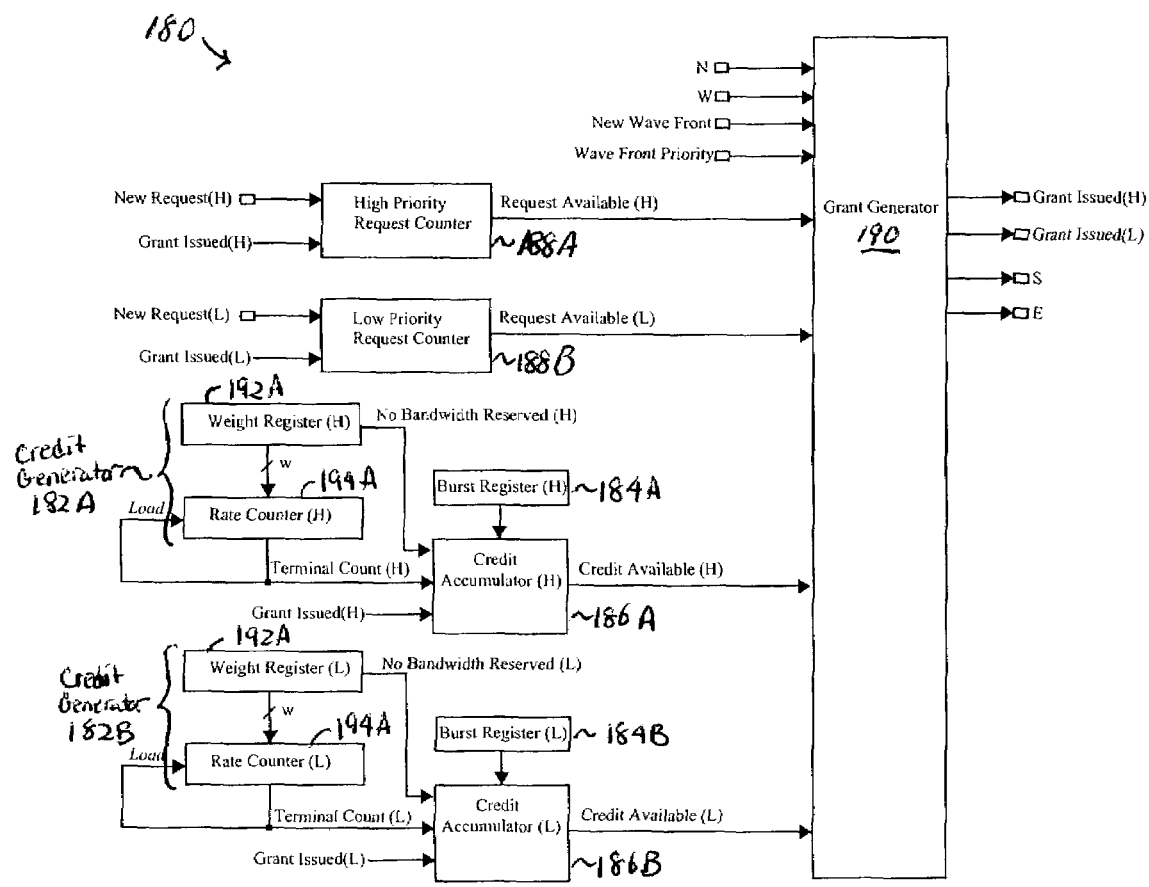
FIG. 8 is a block diagram of an arbitration unit within a WWFA with bandwidth reservation.

FIG. 8 is a block diagram of an exemplary arbitration unit 180 employed within a WWFA with bandwidth reservation. The arbitration unit 180 is configured for use in a four-pass arbiter with two (high and low) levels of queuing priority. The arbitration unit 180 generally includes credit generators 182A, 182B, optional burst registers 184A, 184B, credit accumulators 186A, 186B, and request counters 188A, 188B corresponding to the high and low queuing priorities, respectively. As shown, each credit generator 182 includes a weight register 192 and a rate counter 194 as will be described in more detail below. The arbitration unit 180 further includes a grant generator 190 that receives as input North (N) and West (W) input signals, new wave front signal, wave front priority signal, as well as outputs from the credit accumulators 186 and the request counters 188. The grant generator 190 issues high and low priority grants as well as South (S) and East (E) output signals.

Figure 9:
FIG. 9 is a table listing five registers associated with each of the two queuing priorities.

FIG. 9 is a table 200 listing the five registers 184, 186, 188, 192 and 194 associated with each of the two queuing priorities. In particular, a q-bit request counter register 188 stores requests for bandwidth received from the input port virtual output queues (VOQs). An r-bit rate counter register 194 generates bandwidth credits, e.g., one credit every 10 cell periods, for the associated queue for a particular virtual link. A w-bit weight register 192 is used to program the associated rate counter.

The weight register allows for the reservation of a programmable amount of bandwidth for a given priority within a given arbitration unit. Where the credit generator is a floating point credit generator (as will be described below), the frequency at which the rate counter register 194 is incremented is based upon the value programmed in the weight register that determines how often the rate counter is clocked. In other words, bandwidth credits are generated at a rate that is proportional to the value of the weight register. If a given priority of a given virtual link requires BW fraction of link bandwidth then a credit should be generated once every 1/BW cell periods. If BW=1.0 (i.e., 100% of the link bandwidth), then a credit should be generated every cell period (1/1.0=1). If BW=0.10 (i.e., 10% of the link bandwidth), then a credit should be generate every 10 cell periods (1/0.10=10). The weight register is preferably programmed with a value such that credits are generated at a rate equal to BW credits per cell period. Or similarly, the weight register is programmed such that the spacing between credits is equal to 1/BW cell periods.

A c-bit credit accumulator register 186 accumulates credits generated by the associated rate counter. Lastly, an optional b-bit burst register 184 is used to limit the value of the credit accumulator. Specifically, when the optional burst register 184 is implemented, the value of the credit accumulator is limited to Q+B credits where Q is the number of requests in the request register, and B is the value of the burst register. Alternatively, when the optional burst register 184 is not implemented, the value of the credit accumulator is limited to Q+1 credits.

Figure 10:
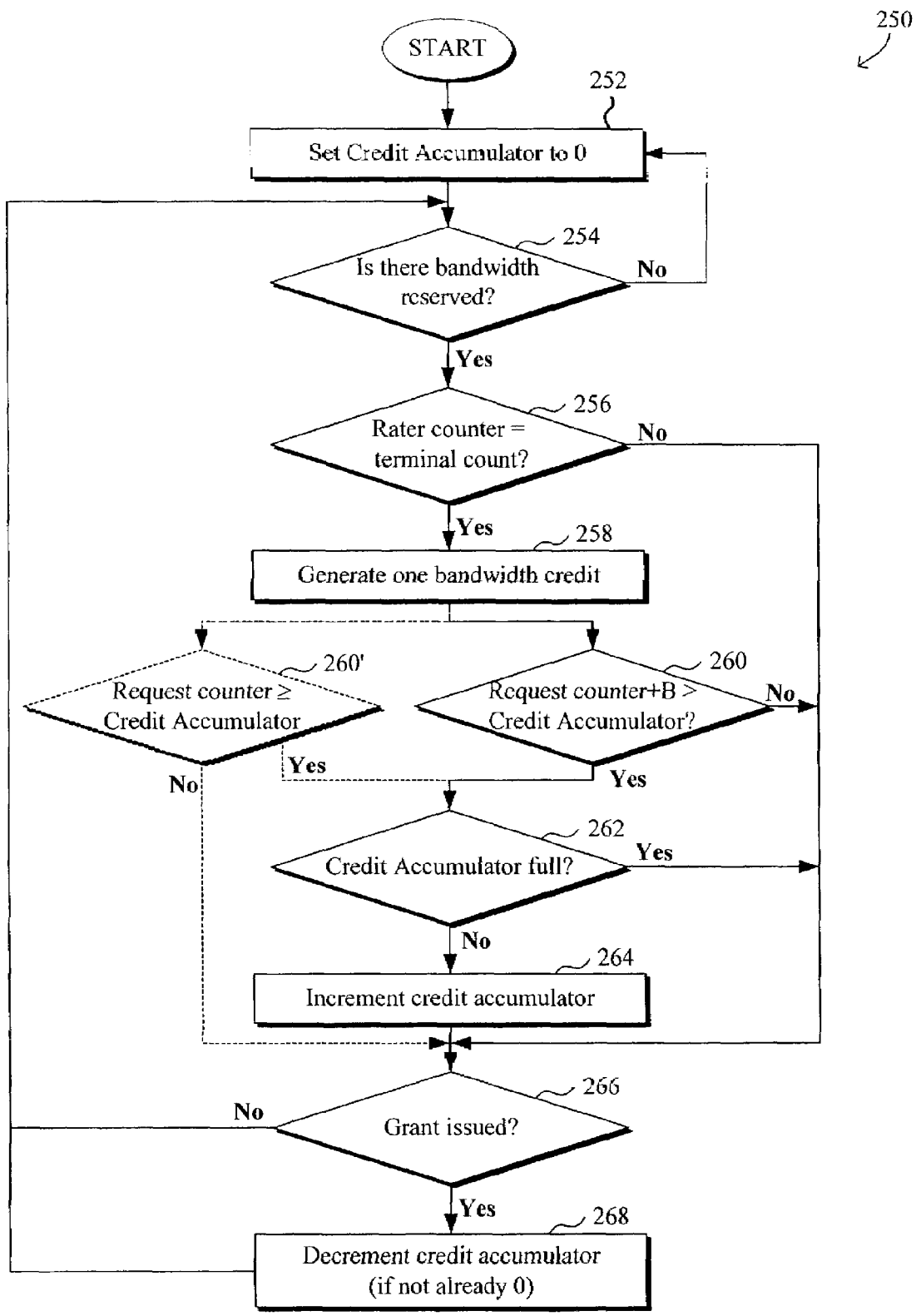
FIG. 10 is a flowchart illustrating a process for adjusting the credit accumulator register.

In a WWFA with bandwidth reservation, each arbitration unit generates bandwidth credits based upon the reserved bandwidth for the associated virtual link. FIG. 10 is a flowchart illustrating a process 250 for adjusting the credit accumulator register 186. In particular, at step 252, the credit accumulator is initialized to 0. This typically occurs when the associated virtual link is initially established. At step 254 a check is made to determine if any bandwidth has been reserved. Each time the rate counter register reaches its terminal count as determined in decision block 256, one bandwidth credit is generated at step 258 and the rate counter is reset.

Next, certain conditions or constraints are tested to determine whether bandwidth credit is to be added to the total stored in the credit accumulator register. First, as shown in decision block 260, bandwidth credit may be added to the credit accumulator register only if the number of requests contained in the request counter register plus the value B of the burst register is greater than the number of credits within the credit accumulator register. Programming a non-zero value into the burst register allows for the accumulation of some number of credits despite the fact that no requests are arriving. The value of the burst register may be set based upon the level of request burstiness associated with a given priority of a virtual link. For example, if B is equal to three, then a given priority of a virtual link can only accumulate three credits beyond the number of requests in its corresponding request counter.

Where the burst register is not implemented within the arbitration unit, decision block 260' is implemented in place of decision block 260. Decision block 260' determines if the request counter is greater than or equal to the credit accumulator. In other words, the value of the credit accumulator is limited to Q+1 credits (i.e., B=1), and the system relies on the distribution of excess bandwidth in order to accommodate VLs with bursty requests. By allowing a virtual link to accumulate at least one credit despite having no pending requests, the delay in granting bandwidth to a low bandwidth virtual link is not dependent upon the credit generation rate associated with the virtual link.

Second, as shown in decision block 262, bandwidth credit may be added to the credit accumulator register only if the number of credits contained in the credit accumulator register is less than the register's maximum value. This constraint limits a given arbitration unit's burst length (i.e., the maximum number of consecutive wave fronts in which it can claim bandwidth) to the maximum value of the credit accumulator. In general, a long burst of one arbitration unit results in cell delays for cells of other arbitration units in the same row or column as the bursting arbitration unit. However, some amount of bandwidth credit needs to be accumulated in order for a given virtual link to obtain its reserved bandwidth due to the natural operation of the WWFA. For instance, assume a system with a 32 by 32 arbiter and virtual link 0,0 has reserved95% of the bandwidth of output link 0, and the other 31 virtual links (VLs 1,0 through 31,0) associated with output link 0 each have reserved 0.1% of the bandwidth of output link 0. Then it is possible that each of the other 31 virtual links receives a credit simultaneously, and also have a request available. Then, for this case, virtual link 0,0 may have to wait up to 31 cell periods before it is able to claim the bandwidth associated with a wave front. The credit accumulator associated with virtual link 0,0 must be capable of holding up to 31 credits in order to weather the combined burst of all the other virtual links associated with output 0. Therefore, in general, a given VL may require a credit accumulator that holds at least n−1 credits (resulting in a $\log_2 n$ bit credit accumulator). The maximum value of the credit accumulator register is preferably programmable on a per queue basis.

If both of the constraints illustrated in decision blocks 260 (or 260') and 262 are met, then the bandwidth credit is added by incrementing the credit accumulator register at step 264. It is noted that whether the constraints are met may be determined in any suitable order and that the order of the decision blocks 260 and 262 shown in FIG. 10 and described above is merely one example.

At step 266 a check is made to determine if the arbitration unit has claimed the bandwidth associated with a given wave front, and therefore has issued a grant. If a given arbitration unit has issued a grant, then the corresponding credit accumulator is decremented by one at step 268 (assuming it is not already at 0).

Credit Generator Details

Figure 11:
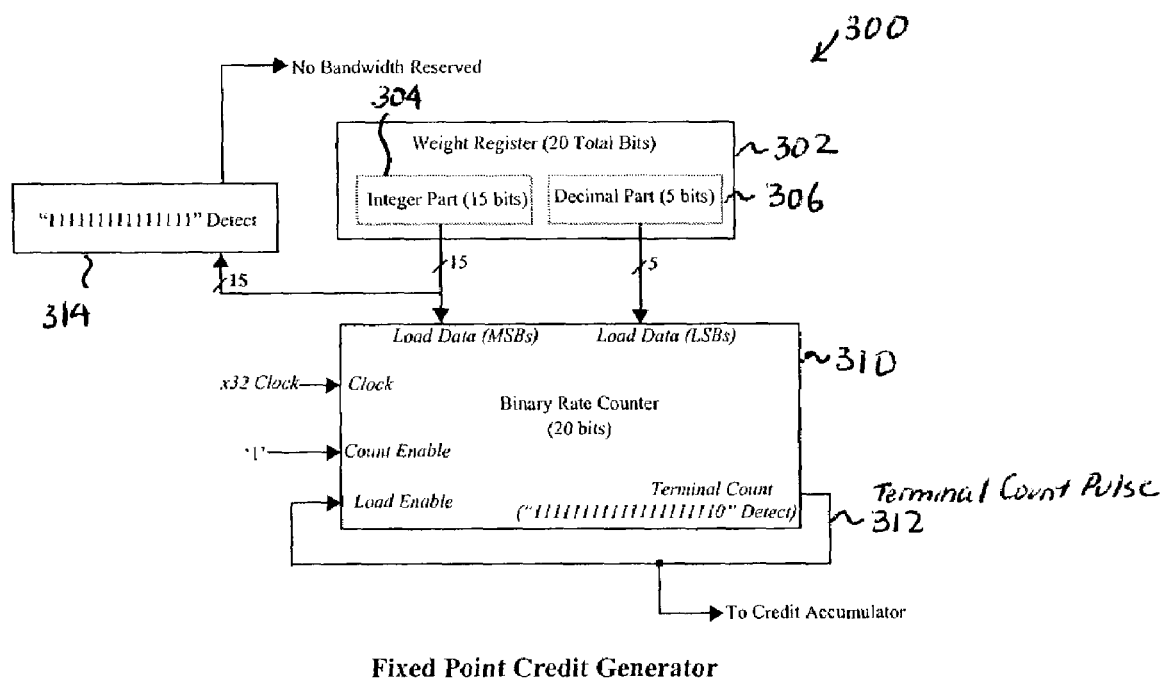
FIG. 11 is a block diagram of an exemplary fixed-point credit generator.

FIG. 11 is a block diagram of an exemplary fixed-point credit generator 300 that may be used for the two credit generators 182A, 182B in the arbitration unit 180 of FIG. 8 to generate bandwidth credits. Each credit generator includes a weight register 302 and a rate counter 310. In the FIG. 11 exemplary generator 300, the weight register 302 contains an integer part 304 that holds 15 bits and a decimal part 306 that holds 5 bits. The rate counter 310 is implemented using a 20 bit binary up-counter that is clocked 32 times per cell period. In general, in order to obtain d bits of decimal precision, the rate counter must be clocked with a clock that operates at $2^d$ times the frequency of the cell clock (where the cell clock frequency is the inverse of the cell period). When the count value of the binary counter reaches 11111111111111111110, a terminal count detect of the rate counter 310 generates a terminal count pulse 312 that is fed to the credit accumulator, and the value contained in the weight register 302 is reloaded into the rate counter 310. The fixed-point credit generator 300 also includes a 15-bit no bandwidth detect 314 that detects when no bandwidth is reserved. In the exemplary credit generator 300, no bandwidth is reserved if the 15-bit integer part 304 has a value of FIG. 12 is a table listing the range of bandwidths that can be allocated with the credit generator of FIG. 11. The weight register is programmed such that a desired spacing between credits generated is achieved. For example, if the desired spacing between credits generated is 2.6875 cell periods, then 2.6875 is converted to binary format (000000000000010.10110), and the one's complement value (111111111111101.01001) is stored in the weight register. For this example, once the one's complement value is loaded into the rate counter, the rate counter will reach its terminal count (111111111111111.11110) eighty-five clock cycles later, and a credit will be generated. From then on, a credit will be generated every eighty-six clock cycles. Since one cell period is equal to thirty-two clock cycles, one credit will be generated every 86/32 (i.e., 2.6875) cell periods. For a particular credit spacing S, the fraction of allocated link bandwidth BW can be determined using the equation:

BW=1/S. Therefore, the amount of allocated bandwidth corresponding to a credit spacing of 2.6875 is 0.37, or 37%.

It should be noted that generally the fastest allowable rate that credits can be generated is once every cell period. For this case, the cell spacing is equal to 1.0, which corresponds to 100% of the link bandwidth. Since cell spacing values less than 1.0 are not allowed (since a value less than 1.0 correspond to generating more than one credit every cell period), when the integer portion of the weight register is programmed with an all one's value (i.e., 111111111111111), this value is detected, and used to indicate that no bandwidth is reserved.

Figure 13:
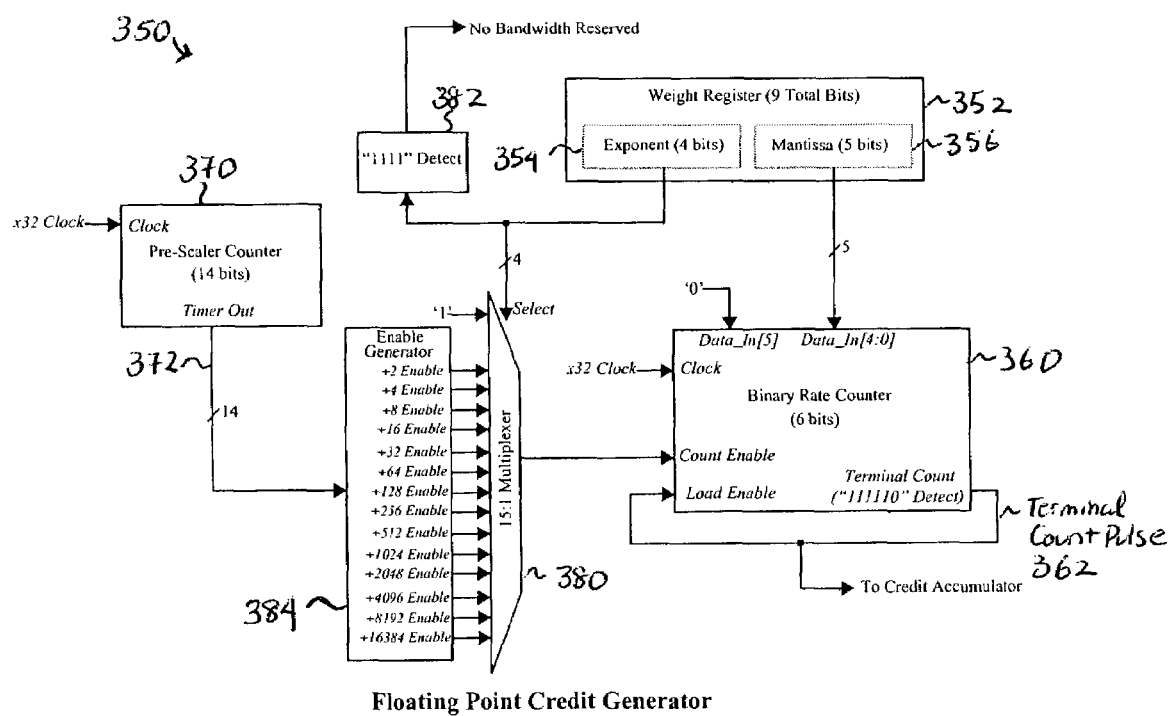
FIG. 13 is a block diagram of an exemplary floating-point credit generator.

Although the fixed-point credit generator is relatively simple to implement, a floating point credit generator that spans the same range of bandwidth allocations can be implemented with fewer resources. FIG. 13 is a block diagram of an exemplary floating-point credit generator 350. Similar to the fixed-point credit generator shown and described above with reference to FIGS. 11 and 12, floating-point credit generator 350 includes a weight register 352 and a rate counter 360. In addition, the floating-point credit generator 350 includes a 14-bit binary up-counter 370, a 15:1 multiplexer 380, and a 4-bit "1111" detect 382 that detects the case where no bandwidth is reserved. The weight register 352 contains an exponent part 354 that holds 4 bits and a mantissa part 356 that holds 5 bits. The rate counter 360 is implemented using a six bit binary up-counter that is clocked 32 times per cell period. When the count value of the binary rate counter 360 reaches 111110, a terminal count detect of the rate counter 360 generates a terminal count pulse 362 that is fed to the credit accumulator and the value contained in the mantissa part 356 of the weight register 352 is reloaded into the rate counter 360.

The rate at which the six-bit rate counter 360 is effectively clocked is controlled by the exponent part 354 of the weight register 352. As shown, a 14-bit binary up-counter 370 is used to generate fourteen separate count-enable signals 372 for the 6-bit rate counter 360. For example, when the ÷2 Enable signal is selected by the 15:1 multiplexer 380 (Exponent="0001"), the 6-bit binary rate counter 360 is enabled once every other ×32 clock cycles, causing the rate counter 360 to be incremented 16 times per cell period. When the ÷64 Enable signal is selected by the 15:1 multiplexer 380 (Exponent="0110"), the 6-bit binary rate counter 360 is enabled once every sixty-four ×32 clock cycles, causing the rate counter 360 to be incremented once every two cell periods. Additionally when the static '1' signal is selected by the 15:1 multiplexer 380 (Exponent="0000"), the 6-bit binary rate counter 360 is enabled every ×32 clock cycle, causing the rate counter 360 to be incremented 32 times per cell period. In general, credit spacing value can be represented using a four bit exponent and a six-bit normalized mantissa of the form: $1.m_{-1}m_{-2}m_{-3}m_{-4}m_{-5} \times 2^{exp}$, where $m_{\vec{\phantom{x}}}$ takes on the values 0 and 1 (binary), and exp takes on the values 0 through 14 (decimal). Since there is always a '1' to the left of the decimal point, this '1' does not need to be explicitly stored, and therefore, a 6-bit mantissa can be indicated using only 5 bits.

FIG. 14 is a table showing the range of bandwidths that can be allocated with the credit generator of FIG. 13. The weight register is programmed such that the desired spacing between credits generated is achieved. For example, if the desired spacing between generated credits is 2.6875 cell periods, then 2.6875 is converted to floating-point binary format ($1.01011 \times 2^1$), and the one's complement value of the mantissa is obtained (=010100). The least significant five bits of the complemented mantissa is then stored in the 5-bit mantissa part of the weight register, while the 4-bit binary representation of the exponent is stored in the 4-bit exponent part of the weight register. Since the most significant bit of the one's complemented mantissa will always be zero, a '0' is always loaded into the most significant bit of the 6-bit rate counter when the five programmable mantissa bits are loaded into the rate counter. Once the rate counter has been loaded, a credit will be generated every time the 6-bit rate counter reaches its terminal count (111110). Since, in this example, the rate counter is incremented every other ×32 clock period (÷2 Enable selected), a credit will be generated every eighty-six ×32 clock cycles.

As is evident from FIGS. 13 and 14, an exponent value of 1111 is used to indicate the case where no bandwidth is reserved. In particular, the 4-bit no bandwidth detect 382 detects the case where no bandwidth is reserved. In the exemplary credit generator 350, no bandwidth is reserved if the 4-bit exponent part 354 has a value of 1111.

Figure 15:
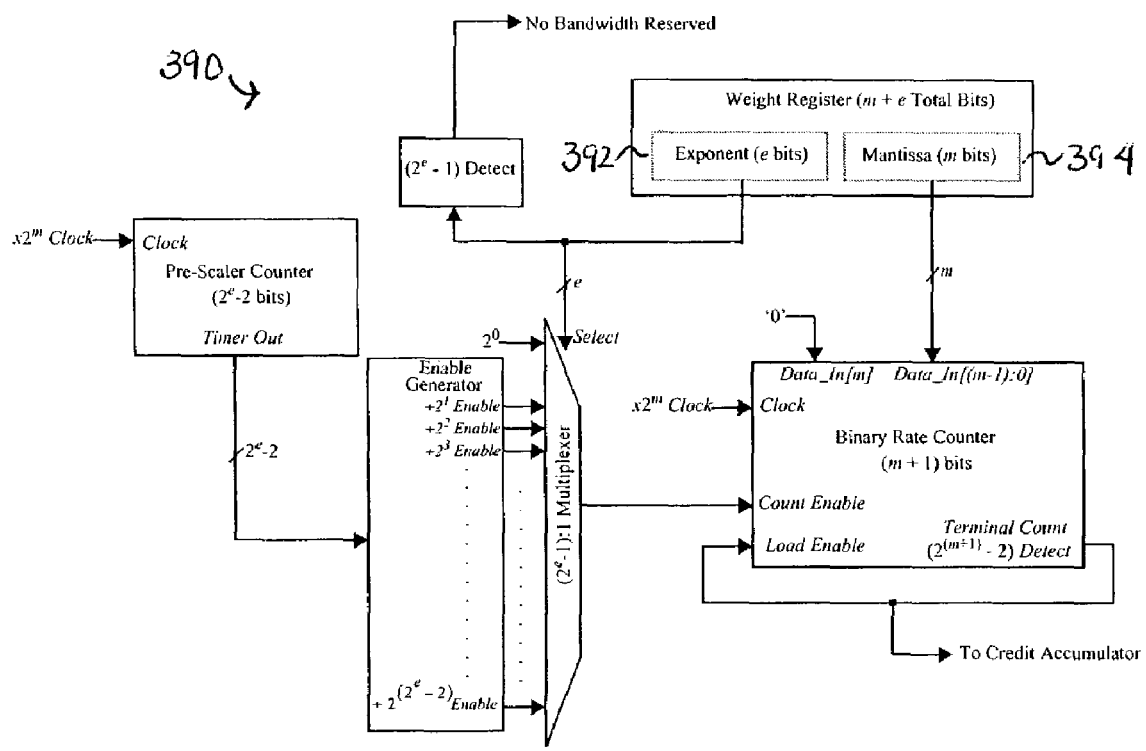
FIG. 15 is a block diagram of an apparatus that can be used to implement any floating-point credit generator containing an e-bit exponent and an m+1-bit mantissa.

FIG. 15 is a block diagram of an apparatus 390 that can be used to implement any floating-point credit generator containing an e-bit exponent 392 and an m+1-bit mantissa 394. The exemplary generator in FIG. 13 can be obtained from the generator 390 in FIG. 15 by setting e to 4, and m to 5.

It is noted that all floating point credit generators within the arbiter can share the 14 bit pre-scaler counter 370 and the enable generator 384 in FIG. 13. Therefore (for the credit generator in FIG. 13), in order to support each queuing priority, each arbitration unit only requires the 9-bit weight register, the 6-bit counter, the 15:1 multiplexer, and the "1111" detector. This can be compared to the 20-bit weight register, the 20-bit counter, and the "111111111111111111" detector that is required to support each queuing priority of each arbitration unit when the fixed-point credit generator is used.

Grant Generator Details

Figure 16:
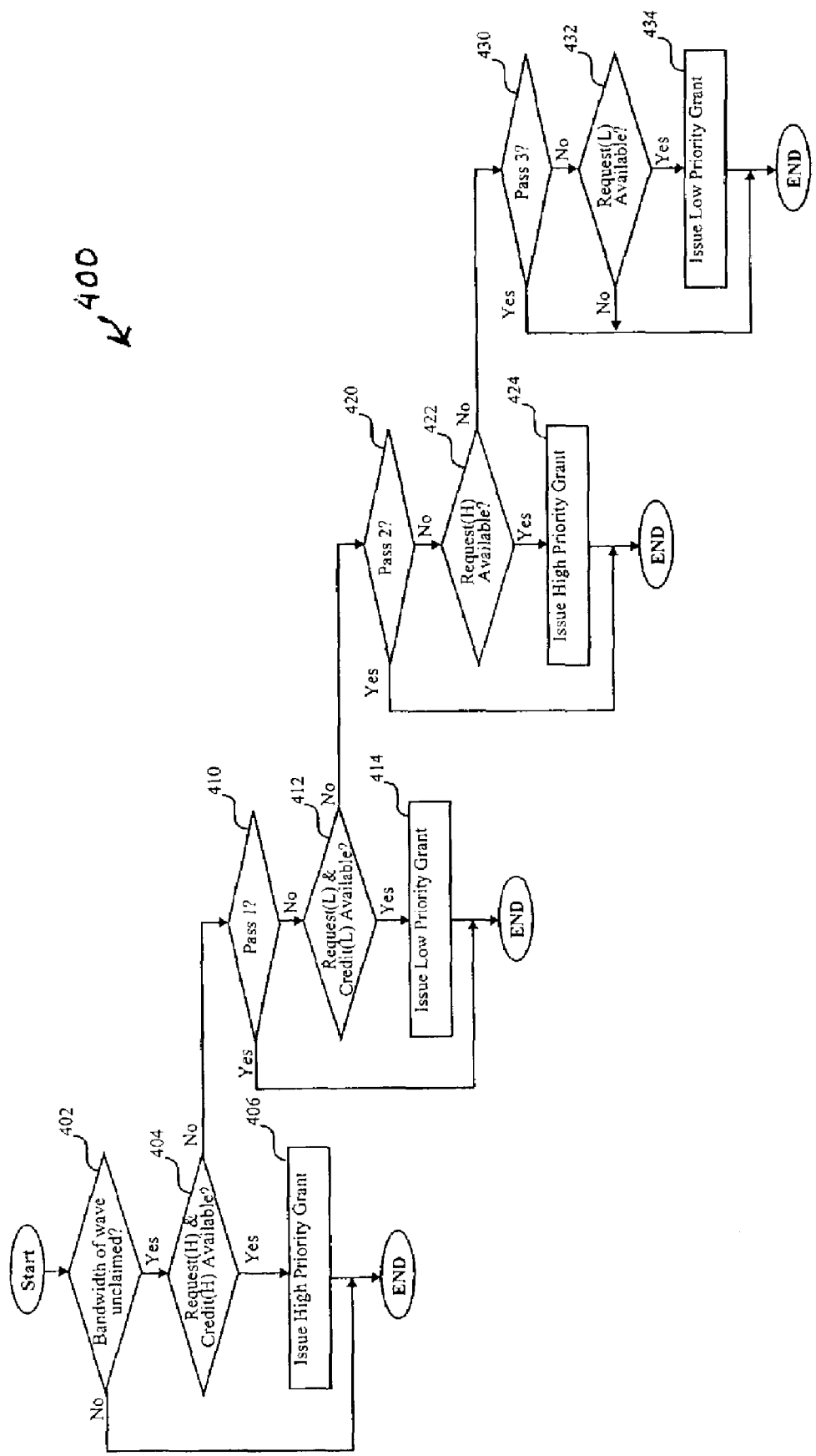
FIG. 16 is a flow chart that illustrates the grant issuing process within the grant generator of FIG. 8.

FIG. 16 is a flow chart illustrating a grant issuing process 400 that may be implemented by the grant generator of FIG. 8. The grant issuing process 400 issues grants and generates the South (S) and East (E) output signals. The process 400 is executed each time a wave front arrives at an arbitration unit. If a new wave front is not being initiated at a given arbitration unit, the North (N) and West (W) inputs are first checked at step 402 in order to determine if the bandwidth associated with the wave front has already been claimed by another arbitration unit. In particular, the North input indicates whether the output bandwidth (associated with the arbitration unit's column) has been claimed, while the West input indicates whether the input bandwidth (associated with the arbitration unit's row) has been claimed. If either the output or input bandwidth has been claimed, then the process ends and no grant is issued at the given arbitration unit. Alternatively, if the bandwidth of the wave front has not been claimed (or if a new wave front is being initiated), and if there is a high priority request pending and at least one high priority bandwidth credit is available as determined in decision block 404, then a high priority grant is issued at step 406, and the process ends.

If there is not both a high priority request pending and a high priority credit available, then a check is made at step 410 to determine if the wave front is associated with pass 1. If the wave front is associated with pass 1, then the process ends. Otherwise, if there is a low priority request pending and at least one low priority bandwidth credit available as determined in decision block 412, then a low priority grant is issued at step 414 and the process ends.

If it is determined in decision block 412 that there is not both a low priority request pending and a low priority credit available, then a check is made at decision block 420 to determine if the wave front is associated with pass 2. If the wave front is associated with pass 2, then the process ends. Otherwise, if there is a high priority request pending as determined at decision block 422, then a high priority grant is issued at step 424 and the process ends. If there is not a high priority request, then a check is made at decision block 430 to determine if the wave front is associated with pass 3. If the wave front is associated with pass 3, then the process ends. Otherwise, if there is a low priority request pending as determined at decision block 432, then a low priority grant is issued at step 434 and the process ends.

If a new wave front is initiated at a given arbitration unit, then the arbitration unit ignores the information on its North and West inputs, and effectively forces its North and West inputs to be activated. A new wave front is initiated as a "Pass 1" wave front. If a grant is issued at a given arbitration unit, then the East and South outputs of the arbitration unit are deactivated as the wave front exits the arbitration unit. If a grant is not issued then the North and West input states are transferred to the South and East outputs respectively as the wave front exits the arbitration unit. If a grant is not issued for a wave front that is initiated at a given arbitration unit, then the arbitration unit simply activates the South and East outputs as the wave front exits the arbitration unit.

Request Counter Details

As discussed above, a request counter mirrors the number of cells contained within the associated virtual output queue. When a new request arrives at a request counter, the request counter is incremented. When an arbitration unit issues a high priority grant, the corresponding high priority request counter is decremented by one. Similarly, when an arbitration unit issues a low priority grant, the corresponding low priority request counter is decremented by one.

Summary of Arbitration Passes

In one preferred embodiment, a given wave front passes through the arbiter array four times before exiting the arbiter array, i.e., makes four passes through the arbiter array, although only two queuing priorities are supported for each arbitration unit. A given wave front thus has four phases, each associated with a pass through the physical array. In order to process all four phases of all wave fronts that are applied to the array, the link cell clock is preferably sped up by a factor of four and all four phases of all wave fronts are time-multiplexed onto one physical array.

Figure 18:
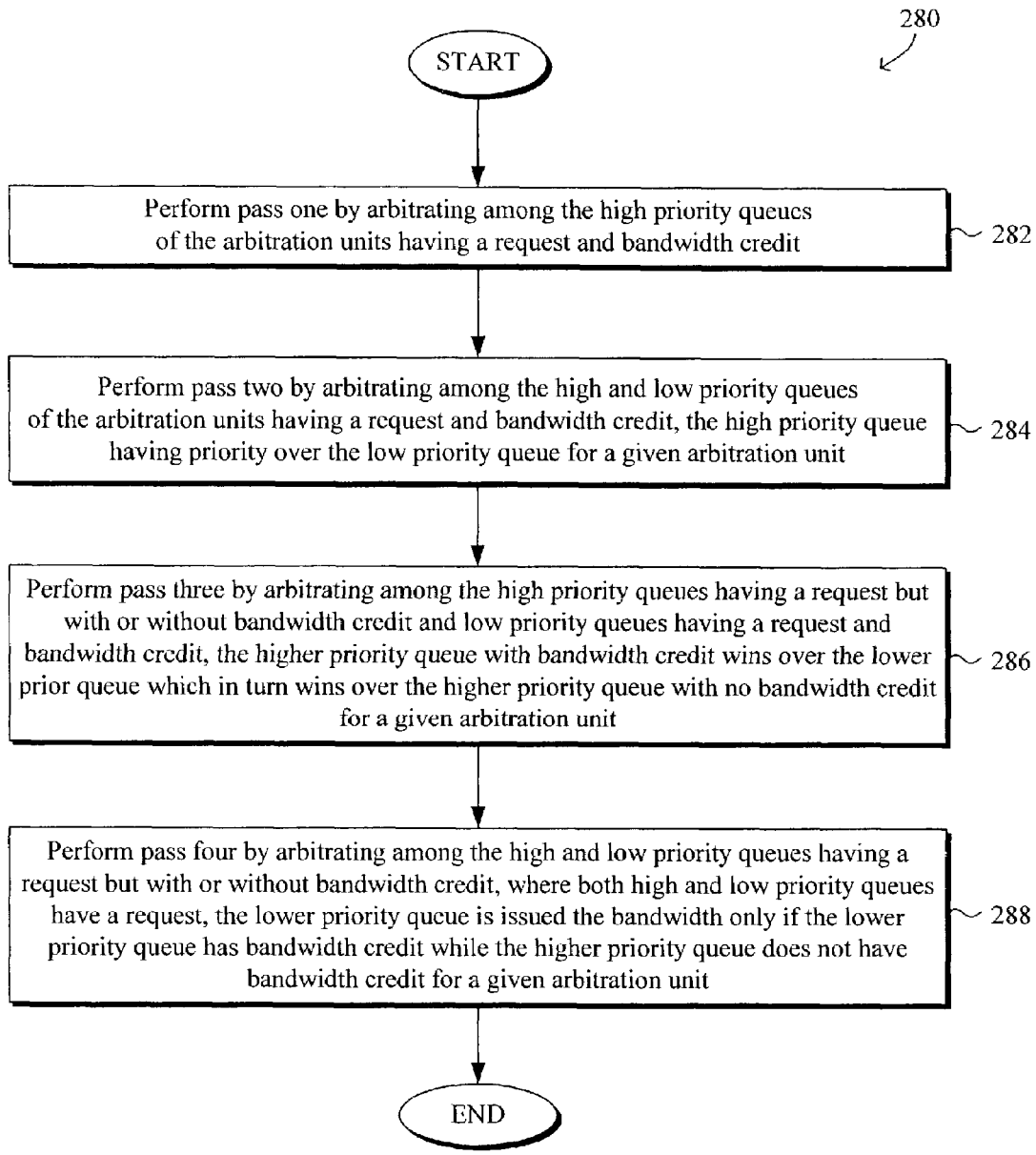
FIG. 18 is a flow chart illustrating a process for performing each of the four passes corresponding to each wave front.

In general, on a given pass through the arbiter array, not all virtual output queues associated with all arbitration units are allowed to compete for the bandwidth of a given wave front. The rules associated with each pass through the arbiter array will now be described with reference to FIGS. 17 and 18. In particular, FIG. 17 is a table 270 listing the four passes 272, 274, 276, 278 associated with each wave front and the corresponding components of the virtual link that are eligible to compete for the bandwidth associated with the wave front. FIG. 18 is a flow chart illustrating a process 280 for performing each of the four passes for each wave front.

The discussion of FIGS. 17 and 18 introduces several terms which will now be generally described. In particular, reserved bandwidth is switch link bandwidth that has been set-aside in advance within the arbiter for a given virtual link and thus is a fixed quantity. The weight registers sets or programs the amount of reserved bandwidth for a given virtual link. Before a virtual link can use any of its reserved bandwidth, the arbiter first issues a portion of this reserved bandwidth to the virtual link using bandwidth credits. Preferably, each bandwidth credit represents one cell worth of link bandwidth. Reserved bandwidth that has been issued to a virtual link in the form of bandwidth credits may be referred to as credited or issued reserved bandwidth. A bandwidth credit is issued to a given virtual link whenever a bandwidth credit is added to a credit accumulator associated with that virtual link. Once a virtual link has been issued bandwidth credits, the virtual link can then claim the corresponding amount of bandwidth during the wave front arbitration process associated the corresponding arbiter.

For the first pass, as illustrated by row 272 in FIG. 17 and step 282 in FIG. 18, only arbitration units of the WWFA with high priority reserved bandwidth credit and a high priority bandwidth request compete for the bandwidth associated with a given wave front.

For the second pass, as illustrated by row 274 in FIG. 17 and step 284 in FIG. 18, arbitration units with high priority reserved bandwidth credit and a high priority bandwidth request and arbitration units with low priority reserved bandwidth credit and a low priority bandwidth request compete for the bandwidth. Within a given arbitration unit, if both the high and low priority queues have a request and bandwidth credit, the high priority queue is issued the bandwidth associated with the wave front.

For the third pass, as illustrated by row 276 in FIG. 17 and step 286 in FIG. 18, arbitration units with a high priority bandwidth request as well as arbitration units with low priority reserved bandwidth credit and a low priority bandwidth request compete for the bandwidth. Where both queues associated with a given arbitration unit are eligible to compete for the bandwidth associated with the given wave front, the higher priority queue with bandwidth credit wins over the lower priority queue which in turn wins over the higher priority queue with no bandwidth credit.

For the fourth and final pass, as illustrated by row 278 in FIG. 17 and step 288 in FIG. 18, all arbitration units with at least one bandwidth request compete for the bandwidth. No bandwidth credit for either queue is required for this pass. Within a given arbitration unit, if both the high and low priority queues are eligible to compete for the bandwidth associated with the given wave front, i.e., both have a request, the lower priority queue is issued the bandwidth only if the lower priority queue has bandwidth credit while the higher priority queue does not have bandwidth credit.

For every link cell slot period, a new wave front is applied to the arbiter array. For example, a given new wave front may be applied to the first wrapped diagonal of the arbiter array. To ensure a degree of fairness, stage rotation is employed in which the stage at which a new wave front is initiated is rotated every link cell slot period. Therefore, if a wave front is initiated at stage 0 for link cell slot i, then the next wave front is initiated at stage 1 for link cell slot i+1. Thus, for the example case where no arbitration units have any bandwidth credits, a given arbitration unit will have the first opportunity to be issued bandwidth on its corresponding output link every nth link cell slot period.

Mapping ATM Service Categories to the WWFA With Reserved Bandwidth

The five dominant ATMF service categories, namely, CBR (continuous bit rate), rt-VBR (real time variable bit rate), nrt-VBR (non-real time variable bit rate), UBR (unspecified bit rate), GFR (guaranteed frame rate), can be mapped to the WWFA with two priorities and reserved bandwidth capabilities. Each VL contains four components: a high priority reserved bandwidth component, a low priority reserved bandwidth component, a high priority non-reserved bandwidth component, and a low priority non-reserved bandwidth component. Each of these components approximately corresponds to a pass through the WWFA. The high priority virtual output queue at the input port along with the associated high priority request counter within the WWFA are preferably dedicated to real time traffic sources. Thus, CBR and rt-VBR share the high priority virtual output queue while nrt-VBR, UBR, and GFR share the low priority virtual output queue.

The reserved bandwidth associated with the high priority virtual queue is preferably set based upon the PCRs (peak cell rates) of the CBR connections feeding the VL, and the SCRs (sustainable cell rates) and the PCRs of the rt-VBR connections feeding the VL. The reserved bandwidth associated with the low priority virtual output queue is set based upon the SCRs of the nrt-VBR connections feeding the VL, any minimum cell rate defined for the UBR connections feeding the VL, and the MCRs (minimum cell rates) of the GFR connections feeding the VL.

WWFA with Bandwidth Reservation Using a Buffered Switch

Figure 1:
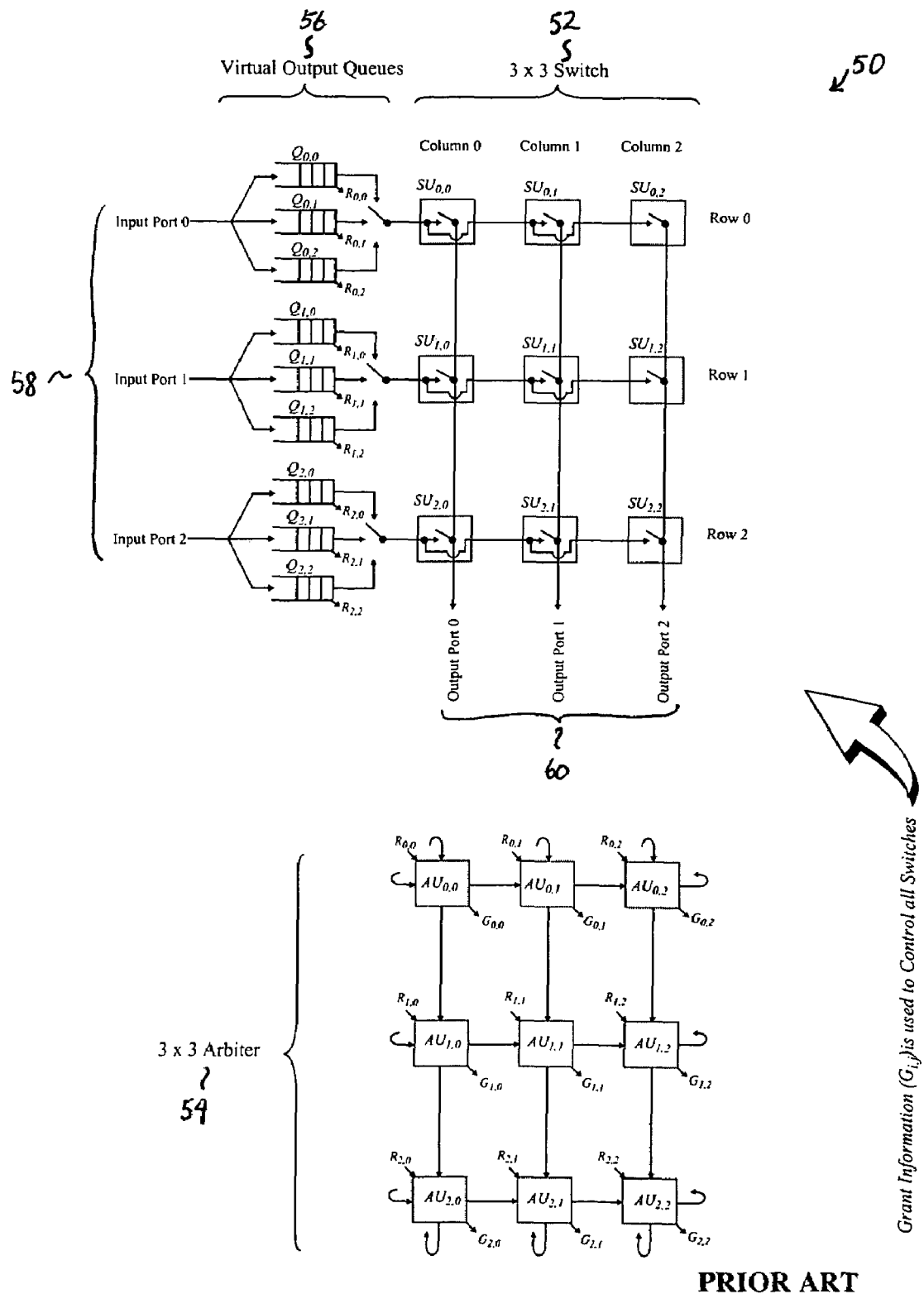
FIG. 1 is a block diagram of an exemplary communication switch supporting three input ports and three output ports.
Figure 2:
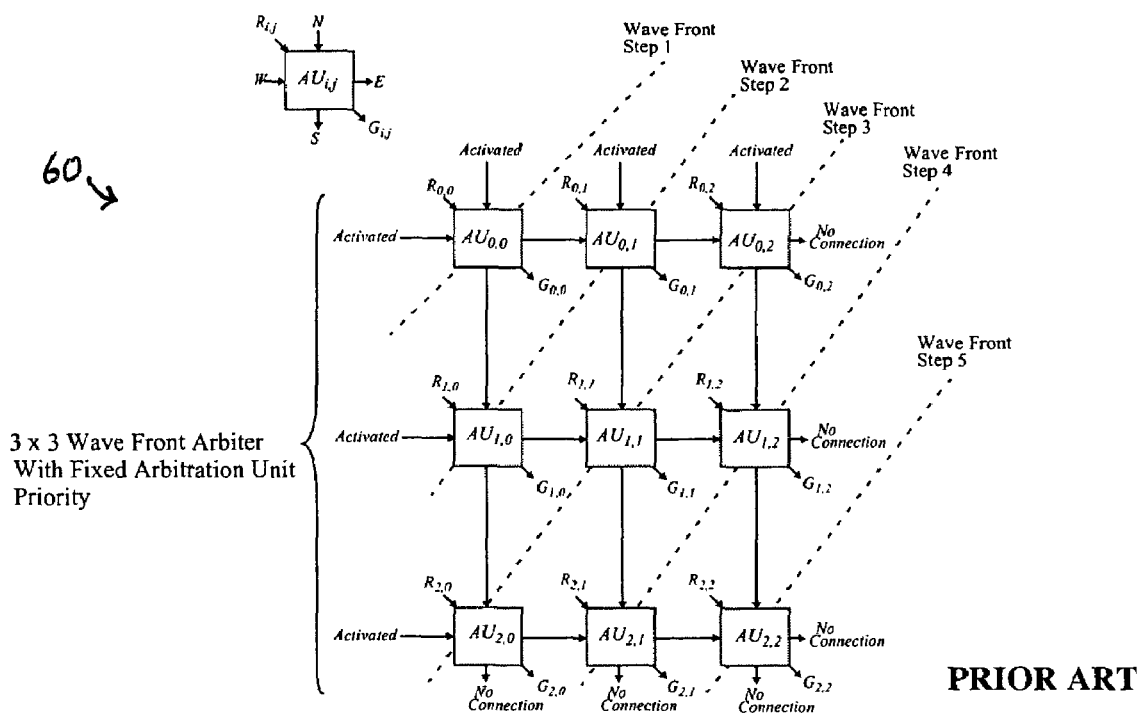
FIG. 2 is a block diagram of a 3×3 wave front arbiter.
Figure 3:
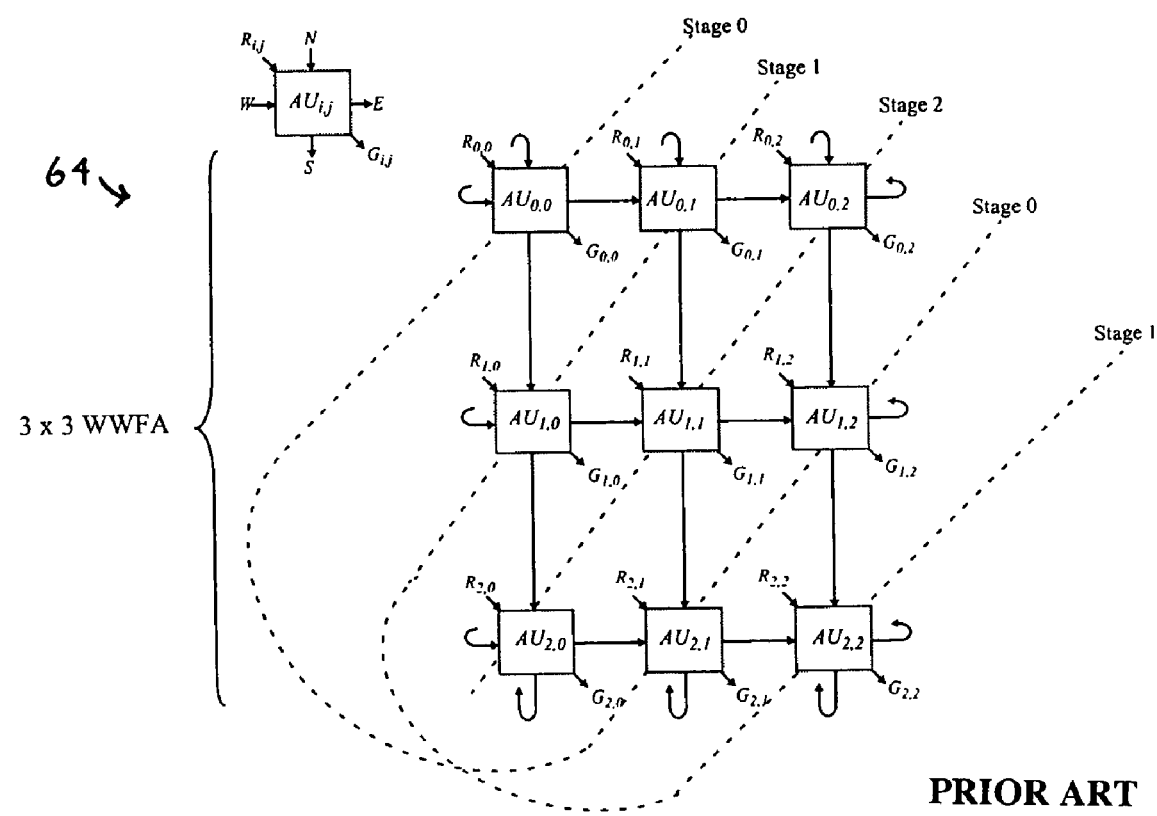
FIG. 3 is a block diagram of a 3×3 wrapped wave front arbiter (WWFA) with three arbitration stages.

The arbiter in FIG. 1 is used to schedule cells through a crossbar switch and it is assumed that the crossbar switch contains no storage buffers for cells. However, an arbiter may also be needed to schedule cells through a switch fabric that contains cell buffers. This is especially true if the sizes of the cell buffers within the switch fabric are relatively small, such that they are susceptible to overflowing. Often, large high-speed buffered switches are constructed using Application Specific Integrated Circuits (ASICs) that are only able to contain a limited amount of high-speed memory. Such a switch requires an arbiter in order to prevent cell loss within the fabric.

Figure 19:
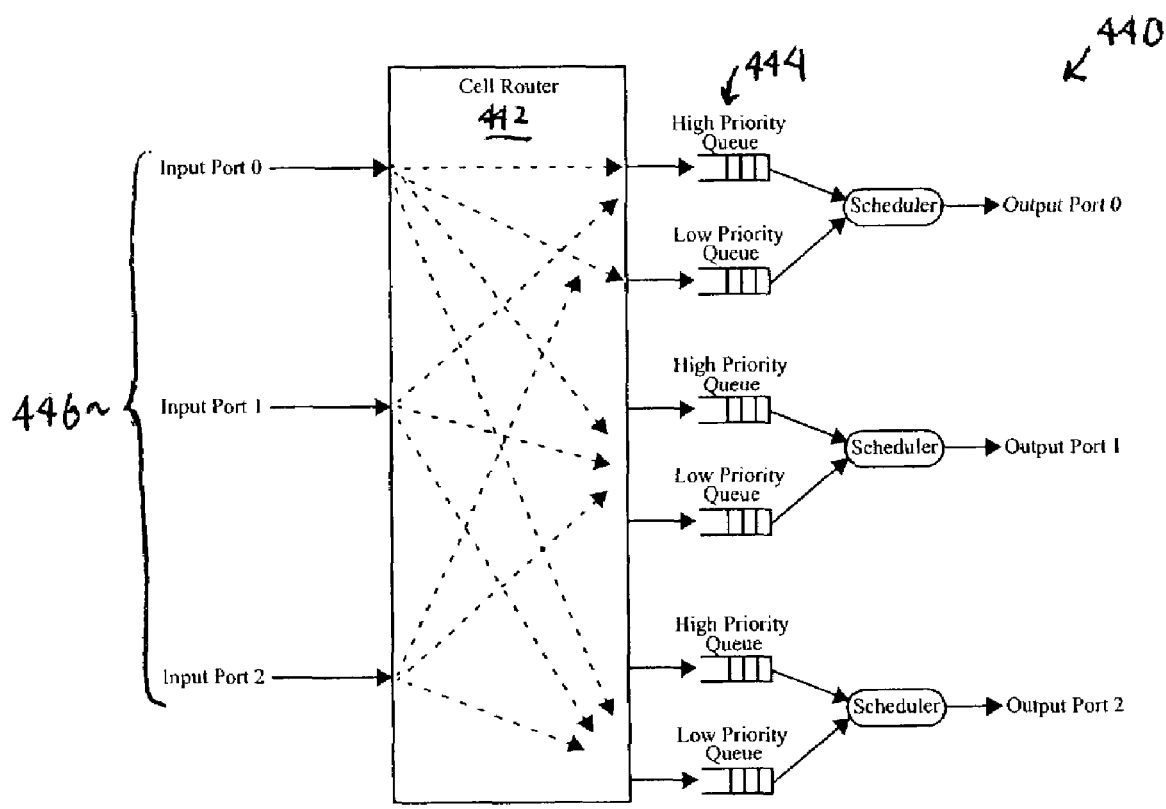
FIG. 19 is a block diagram illustrating an exemplary 3×3 output buffered switch with shallow (i.e., small) output queues.

FIG. 19 is a block diagram illustrating an exemplary 3×3 output buffered switch 440 with shallow (i.e., small) output queues 444. The switch 440 contains a cell router 442 and three output queue groups 444. The cell router 442 examines the cell header of each cell arriving at each input port 446, and routes each cell to the appropriate output queue based upon the cell header information. The cell header contains both output port information and queuing priority information. A switch fabric that is able to forward cells based upon cell header information is called a "self-routing" switch fabric. Each output queue group may contain multiple queues. For example, the switch fabric shown in FIG. 19 contains two priority queues per output. In such a configuration, cells with low transfer delay requirements (e.g., CBR cells) might be directed to the high priority queue of a given output while cells with less stringent transfer delay requirements (e.g., UBR cells) might be directed to the low priority queue of a given output. The scheduler at the output of each queue group in FIG. 19 could be a simple "strict priority" scheduler, or a more complex "weighted" type scheduler. If a strict priority scheduler is used, then cells that are contained in the low priority queue are forwarded to the output port only if the high priority queue is empty.

If a WWFA with bandwidth reservation is used to schedule cells through a self-routing buffered switch, then the $n^2$ control signals that are depicted in FIG. 1 are no longer required, thus simplifying the system. Also, assuming that the input signals to the switch fabric are kept in alignment with one another, each output queue group will never contain more than one cell. This is because the WWFA (as previously described) only schedules one cell to each output port during any given cell period. (For this case, there is obviously no need for more than a single priority queue at each output.) However, the buffers within the fabric can be used to further simplify the overall system construction. For instance, since there are buffers within the fabric, there is no longer a requirement that the cells associated with a set of grants of a given cell slot period arrive at the fabric simultaneously. If arbiter scheduled cell streams arrive at the inputs to the switch fabric slightly skewed from one another, cells that end up competing for the same output port will simply be queued, and not dropped as would be in the case for a non-buffered crossbar switch.

WWFA With Bandwidth Reservation Using a Buffered Switch and Arbiter Speedup

When certain traffic patterns are applied to the inputs of a switch that is using a WWFA with bandwidth reservation, internal blocking scenarios can occur within the arbiter that may limit the overall output reserved bandwidth link utilization to less than 70%. Adding an arbiter speedup mode to the WWFA can increase the reserved bandwidth link utilization for these traffic patterns. The arbiter speedup mode takes advantage of the buffers within a buffered switch in order to circumvent any short term blocking conditions within the WWFA.

When arbiter speedup is enabled, the arbiter is allowed to grant two (or more) different input ports access to the same output port during a given cell slot period. Since the switch fabric only contains a finite amount of buffering, the arbiter must keep track of the depths of the switch fabric buffers in order to prevent the buffers from overflowing. Once the switch buffer associated with a given output reaches a predetermined threshold, the arbiter forces the arbiter speedup of the associated output to its "off" state.

For a WWFA without speedup, only one input port is granted access to a given output port during any given cell period. Once a given input port is granted access to a given output port, all other input ports are prevented from accessing the given output port via the "South" enabling signal. In order to allow two input ports to be granted access to a given output port, the arbiter is modified so that two "South" enabling signals are passed down each column of the arbiter array. Therefore, as long as arbiter speedup is enabled, each wave front will have two possible grants associated with it in the North to South direction. It should be noted that, as before, each wave front will still only have one grant associated with it in the West to East direction. In other words, a given input port will still only be given access to one output port during a given cell period. When a given wave front exits the arbiter array (after completing all four passes), the arbiter examines the two "South" output signals in order to determine how many grants were issued with respect to the wave front. For instance, if only one grant was issued, then only one of the two South signals would be deactivated. Similarly, if two grants were issued, then both South signals would be deactivated. Based upon this information, the amount of cell buildup within the switch fabric can be recorded using a simple counter.

Figures 20, 21:
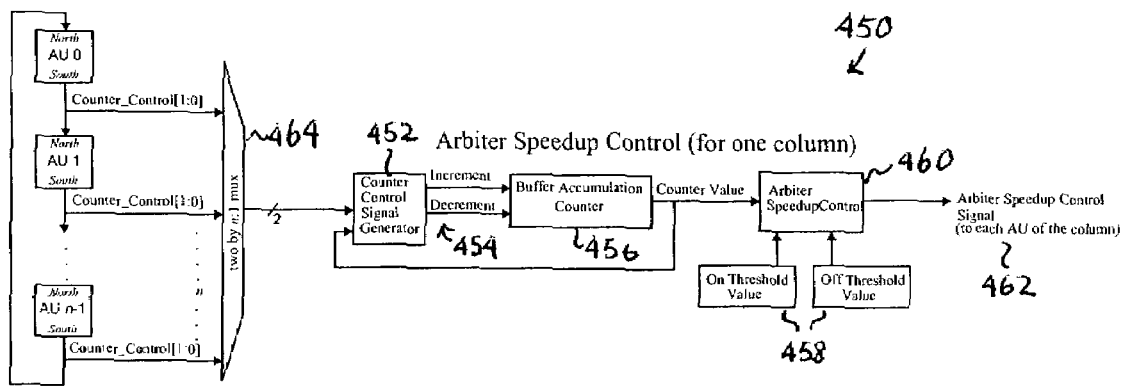
FIG. 20 is a table illustrating the operation of a buffer accumulation counter.
FIG. 21 is a block diagram illustrating the logical multiplexing of Counter_Control information, along with additional circuitry for generating the arbiter speedup control signal associated with each column of an arbiter array.

For the case where each switch fabric output has a single priority buffer, there is one such counter for recording the amount of cell buildup within the switch fabric associated with each column of the arbiter array. These counters are referred to as "buffer accumulation" counters. The operation of such a counter is depicted in the table of FIG. 20. If only a single grant is issued during a given cell period (for a given output port), then there will be no switch fabric buffer depth increase, since one cell is normally drained from the corresponding output port switch buffer every cell slot period. On the other hand, if two grants are issued for the same output port during the same cell period, then there is a net increase of one cell within the switch fabric buffer of that output port. Finally, if no grants are issued during a given cell period, then there is a net decrease of one cell within the switch fabric buffer of that output port, since no cells will be sent to that output port during that cell period, and one cell is drained from that output port during that cell period. Since the final states of a wave front's corresponding "South" signals are used to control the counter in the table of FIG. 20, these final South signals will be referred to as the Counter_Control [1:0] signals. This is done in order to distinguish between the intermediate states associated with the South signals, and the final state of the South signals. For an n×n arbiter, n "buffer accumulation counters" are needed; one for each output port (or one corresponding to each column of the array). Note that the buffer accumulation counter should not be decremented if it is at zero.

Additional Circuitry for Controlling Arbiter Speedup of Each Column

Figure 4A:
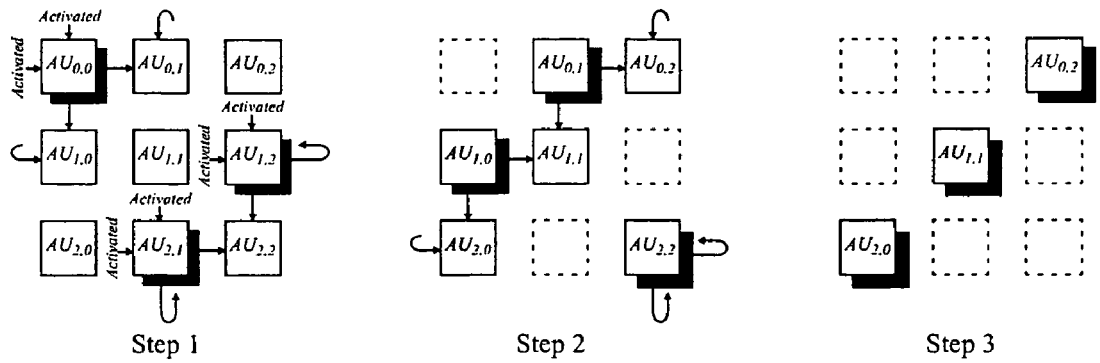
FIGS. 4A-4C are block diagrams illustrating wave fronts initiated at each of three arbitration stages for the 3×3 wrapped wave front arbiter of FIG. 3.
Figure 4B:
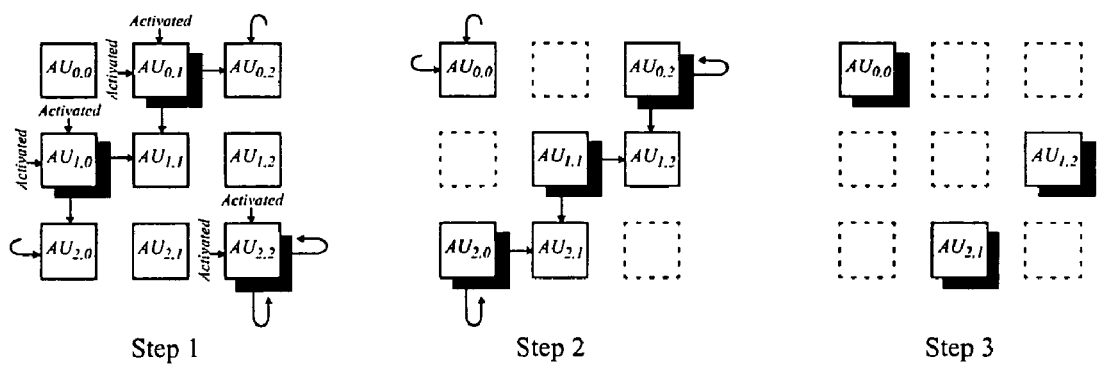
Figure 4C:
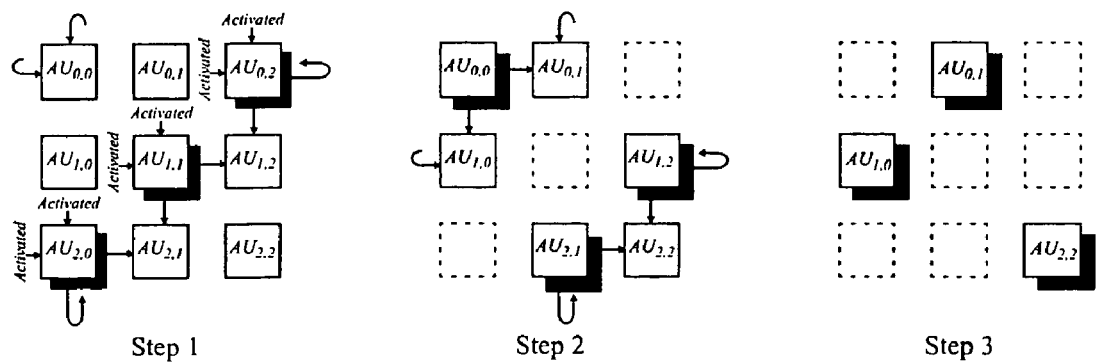

When the insertion of new wave fronts are rotated among the stages of the arbiter (as shown in FIGS. 4A-4C), the final value of the South signals for a given wave front (i.e., the Counter_Control[1:0] signals) do not exit the arbiter array at a single arbitration unit (AU) within a given column of the array. Instead, the exit point rotates among the AUs of a given column. Because of this, a method needs to be used to gather all the Counter_Control signals of a column at a common point. One method is to dedicate one pass through the arbiter to the forwarding of the Counter_Control signals to a common AU exit point. Another method is to create a separate forwarding path outside of the arbiter array.

FIG. 21 is a block diagram illustrating an arbiter speedup control signal generator 450 associated with each column of the arbiter array. In particular, the arbiter speedup control signal generator 450 includes a multiplexer 464 that logically multiplexes Counter_Control information as well as additional circuitry for generating the arbiter speedup control signal 462 to each AU of the corresponding column of the arbiter array. In particular, a counter control signal generator 452 generates an increment and decrement signals 454 based upon the table of FIG. 20. The increment and decrement signals 454 are received by a buffer accumulation counter 456. A counter value output by the buffer accumulation counter 456 is compared to On and Off threshold values 458 by an arbiter speedup control 460. One threshold value is used to turn on the arbiter speedup while the other threshold value is used to turn off the arbiter speedup. The arbiter speedup control signal 462 is fed back to each arbitration unit within the corresponding column. Each column's arbiter speedup control mechanism operates independently from the arbiter speedup control mechanism of other columns.

Use of the Arbiter Speedup Control Signal Within an Arbitration Unit

Since a given arbitration unit is dedicated to a particular input/output port combination, and since a given input is always only allowed to send one cell to the switch fabric during any given cell period, a given arbitration unit can only issue one grant for a given wave front when arbiter speedup is enabled. The use of the speedup control signal by the arbitration units may be arbiter implementation dependent. Specifically, it may depend upon the number of passes supported within a particular arbiter implementation. In general, the arbiter speedup control signal is used as an additional enable signal for the "second" grant associated with a given wave front. If the arbiter speedup control signal is in the "off" state for all columns of the arbiter array, then the arbiter behaves in the same manner as the previously described arbiters (i.e., only a single input port is granted access to a given output port during any given cell period).

If a single pass arbiter is implemented, a given arbitration unit is allowed to claim the first or second grant associated with a given wave front if the arbiter speedup control signal is in the "on" state (i.e., arbiter speedup mode is enabled). However, if the arbiter speedup control signal is in the "off" state (i.e., arbiter speedup mode is disabled), then a given arbitration unit is not allowed to claim the second grant associated with a given wave front (only the first grant of the wave front can be claimed).

In a two-pass arbiter, one pass is usually assigned a higher priority over the other. For instance, the first pass could be used for "reserved bandwidth", and the second pass could be used for both reserved and unreserved bandwidth. A two-pass arbiter could be implemented using either one or two arbiter control signals.

If a two-pass arbiter is constructed using a single arbiter control signal, then, in one implementation, during either pass, only those arbitration units that have both a pending request and a bandwidth credit are allowed to claim the second grant of a given wave front when arbiter speedup is enabled. Arbitration units with a pending request and no bandwidth credits are only allowed to claim the first grant of a given wave front (not the second) and only on the wave front's second pass through the arbiter. As before, those arbitration units that have both a pending request and a bandwidth credit are allowed to claim the first grant of a given wave front during either pass, regardless of whether or not arbiter speedup is enabled. Thus in this implementation, cell build up within the output buffers of a switch fabric is only allowed in the support of reserved bandwidth.

If a two-pass arbiter is constructed using two arbiter control signals then there are two "arbiter speedup ON" thresholds associated with a given buffer accumulation counter, and two "arbiter speedup OFF" thresholds associated with a given buffer accumulation counter. The first pair of on-off thresholds is used to drive the first arbiter speedup control signal, and the second pair of on-off thresholds is used to drive the second arbiter speedup control signal. The output of the buffer accumulation counter within each arbiter speedup control block is fed to all four threshold registers. In this implementation, as long as the cell build up within the switch fabric is small, those arbitration units that do not have any bandwidth credits may claim the second grant associated with a given wave front. However, once the cell build up exceeds a certain threshold, only those arbitration units with bandwidth credit are able to claim the second grant associated with a given wave front. Therefore, as long as the first "off" threshold is not exceeded, arbitration units with a request and no bandwidth credit are allowed to claim the first or second grant associated with a given wave front, during the second pass. Once the first "off" threshold is exceeded, arbitration units with a request and no bandwidth credit are not allowed to claim the second grant associated with a given wave front, during the second pass. (They can only claim the first grant.) Likewise, as long as the second "off" threshold is not exceeded, arbitration units with a request and bandwidth credit are allowed to claim either the first or second grant associated with a given wave front, during either pass. Once the second "off" threshold is exceeded, no arbitration unit is allowed to claim the second grant associated with a given wave front. After the second "off" threshold is exceeded and the second arbiter speedup control signal is disabled, the depth of the corresponding output switch buffer will begin to decrease. Once the depth drops below the threshold value indicated by the second "on" threshold register, those arbitration units that have both a pending request and bandwidth credit are again allowed to claim the second grant associated with a given wave front.

period. Often, a queued cell is sent to an output link. For instance, during cell period 2, although no cell is sent from any input link to output link 1, queue 1 has a cell stored from a previous cell period, so a cell can be transferred to output link 1 during cell period 2. As indicated by the table below, no queue depth ever exceeds one cell in this example.

| Cell Period | Stage That Wave is Initiated | Connections Made | Switch Queue Depth after the Cell Transfer | | | Outputs that Cells are Transferred |
|---|---|---|---|---|---|---|
| | | | Queue 0 | Queue 1 | Queue 2 | |
| 0 | 0 | 2 to 1, 1 to 2, 0 to 1 | 0 | 1 | 0 | 1, 2 |
| 1 | 1 | 1 to 0, 0 to 1, 2 to 0 | 1 | 1 | 0 | 0, 1 |
| 2 | 2 | 2 to 0, 0 to 2, 1 to 2 | 1 | 0 | 1 | 0, 1, 2 |
| 3 | 0 | 2 to 1, 1 to 2, 0 to 1 | 0 | 1 | 1 | 0, 1, 2 |
| 4 | 1 | 1 to 0, 0 to 1, 2 to 0 | 1 | 1 | 0 | 0, 1, 2 |
| 5 | 2 | 2 to 0, 0 to 2, 1 to 2 | 1 | 0 | 1 | 0, 1, 2 |

If the depth then drops below the threshold value indicated by the first "on" threshold register, then arbitration units with a request and no bandwidth credit are again allowed to claim the second grant associated with a given wave front (during the second pass only).

EXAMPLE

In order to illustrate the potential throughput increase when using an arbiter with speedup, consider the following six connections between the input and output ports of a 3×3 system, with each connection reserving 50% of a port's bandwidth:

Port 0 to Port 1, Port 0 to Port 2;
Port 1 to Port 0, Port 1 to Port 2; and
Port 2 to Port 0, Port 2 to Port 1.

A wave front in a WWFA without speedup will consider a pair of these connections at a time (based on the stage position of the diagonal wave as it advances through the arbiter array). (Refer to FIGS. 4A-4C for the following discussion.) Therefore, when a wave front is initiated at stage 0, a connection will be made between input port 2 and output port 1, and between input port 1 and output port 2. No other connections can be made as the wave front propagates through stages 1 and 2. Similarly, when a wave front is initiated at stage 1, a connection will be made between input port 0 and output port 1, and between input port 1 and output port 0. No other connections can be made as the wave front propagates through stages 2 and 0. Finally, when a wave front is initiated at stage 2, a connection will be made between input port 0 and output port 2, and between input port 2 and output port 0. No other connections can be made as the wave front propagates through stages 0 and 1. The net effect is that only two cells will be transferred to each output port during each cell period. This results in a throughput of only 67%.

With arbiter speedup, the input that was previously blocked during each cell period now has another opportunity and, as the wave front advances, it will make a connection to an output that is already receiving a cell. Therefore, 100% throughput is achieved on each output link. The table below illustrates the repetitive sequence of events that occurs across three cell periods. As can be seen, three connections are made every cell period, and after two cell periods, a cell is transferred to each switch output link during every cell period.

Four Pass WWFA With Bandwidth Reservation Using a Buffered Switch and Arbiter Speedup The concepts discussed above with reference to the two-pass arbiter with bandwidth reservation and arbiter speedup can be extended to a four-pass arbiter. With a four-pass arbiter, it is assumed that two priorities are supported: a high priority and a low priority. Also, it is assumed that both reserved and non-reserved cell transfers are supported. Finally, it may also be assumed that the switch fabric contains separate high and low priority queues at each switch fabric output (as shown in FIG. 19), such that high priority cells are stored in the high priority switch fabric queues and low priority cells are stored in the low priority switch fabric queues. In one case, the two switch fabric queues within a queue group are constructed such that they share one common pool of cell buffers. As cells arrived at the switch fabric, the cell buffers within the buffer pool are dynamically assigned to each queue within a queue group. Such an implementation allows the use of a single buffer accumulation counter for each column of the arbiter array. If a four-pass arbiter is constructed using a single arbiter control signal, then, in one implementation, only those arbitration units that have both a pending request of a given priority and a matching bandwidth credit of the same priority are allowed to claim the second grant of a given wave front when arbiter speedup is enabled. Arbitration units with a pending request and no matching bandwidth credit are only allowed to claim the first grant of a given wave front (not the second). For all passes, the previously defined rules as illustrated in FIG. 18 would still apply. When arbiter speedup is disabled on a given column of the array, no arbitration unit within the column is allowed to claim the second grant associated with a given wave front.

By adding additional arbiter speedup control signals to the four-pass arbiter, additional rules could be applied concerning the ability of an arbitration unit to claim the second grant of a given wave front during particular passes. These rules would be similar to the rules that were applied for the case of the two-pass arbiter.

Several references are cited and/or described herein. All references cited, such as issued patents and publications, are incorporated by reference in their entireties.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for reserving bandwidth of a given priority using a wrapped wave front arbiter (WWFA) for arbitrating bandwidth among virtual links between input and output ports associated with WWFA, each virtual link supporting one or more priorities, and each virtual link corresponding to an arbitration unit of the WWFA, comprising:

performing during a cell period at least one bandwidth arbitration pass of a wave front of the WWFA wherein arbitration units having a reserved bandwidth request of a given priority and reserved bandwidth credit of the given priority compete for the bandwidth associated with the wave front, and wherein arbitration units not having a reserved bandwidth request of the given priority and reserved bandwidth credit of the given priority do not compete for the bandwidth associated with the wave front;

performing during said cell period at least one subsequent bandwidth arbitration pass of the wave front wherein arbitration units having a reserved bandwidth request of the given priority compete for the bandwidth associated with the wave front.

2. The method for reserving bandwidth in a WWFA of claim 1, further comprising:

granting a first set of requests for bandwidth, if any, as a result of said performing at least one bandwidth arbitration pass, each grant of the first set of grants being associated with a different output port; and granting a second set of requests for bandwidth, if any, as a result of said performing at least one subsequent bandwidth arbitration pass, each grant of the second set of grants being associated with a different output port selected from output ports ungranted in the first set of grants.

3. The method for reserving bandwidth in a WWFA of claim 1, wherein each virtual link supports only one priority.

4. The method for reserving bandwidth in a WWFA of claim 1, wherein each virtual link supports a high priority and a low priority.

5. The method for reserving bandwidth in a WWFA of claim 4, wherein during a first bandwidth arbitration pass of the wave front only arbitration units having high priority reserved bandwidth credit and a high priority bandwidth request compete for the bandwidth associated with the wave front;

wherein during a second bandwidth arbitration pass of the wave front arbitration units having high priority reserved bandwidth credit and a high priority bandwidth request and arbitration units having low priority reserved bandwidth credit and a low priority bandwidth request compete for the bandwidth associated with the wave front;

wherein during a third bandwidth arbitration pass of the wave front arbitration units having a high priority bandwidth request and arbitration units having low priority reserved bandwidth credit and a low priority bandwidth request compete for the bandwidth associated with the wave front; and wherein during a fourth bandwidth arbitration pass of the wave front arbitration units having at least one bandwidth request compete for the bandwidth associated with the wave front.

6. The method for reserving bandwidth in a WWFA of claim 5, wherein within a given arbitration unit, a high priority bandwidth request with a high priority reserved bandwidth credit has priority for the bandwidth over a low priority bandwidth request with a low priority reserved bandwidth credit, if the low priority bandwidth request with low priority reserved bandwidth credit is eligible to compete for the bandwidth, a low priority bandwidth request with a low priority reserved bandwidth credit has priority for the bandwidth over a high priority bandwidth request without high priority reserved bandwidth credit, if the high priority bandwidth request without high priority reserved bandwidth credit is eligible to compete for the bandwidth, and a high priority bandwidth request without high priority reserved bandwidth credit has priority for the bandwidth over a low priority bandwidth request without low priority reserved bandwidth credit, if the low priority bandwidth request without low priority reserved bandwidth credit is eligible to compete for the bandwidth.

7. The method for reserving bandwidth in a WWFA of claim 1, wherein each priority of each virtual link has associated therewith a bandwidth credit accumulator register indicating the level of remaining reserved bandwidth credit, if any, a reserved bandwidth weight register for programming a predetermined level of reserved bandwidth, a request counter register for tracking the number of bandwidth requests, and a rate counter register for facilitating in generating reserved bandwidth credits for the bandwidth credit accumulator register.

8. The method for reserving bandwidth in a WWFA of claim 7, further comprising periodically incrementing the rate counter register, wherein the rate counter register is periodically incremented depending upon the value of the weight register.

9. The method for reserving bandwidth in a WWFA of claim 8, wherein each priority of each virtual link is further associated with a burst register having a predetermined value for limiting the value of the bandwidth credit accumulator register.

10. The method for reserving bandwidth in a WWFA of claim 9, further comprising:

upon the rate counter register reaching a predetermined value, generating a bandwidth credit for the bandwidth credit accumulator register and resetting the rate counter; and incrementing the bandwidth credit accumulator upon generating of the bandwidth credit if:

the value of the request counter register plus the value of the burst register is greater than the value of the bandwidth credit accumulator register; and the bandwidth credit accumulator register is less than a predetermined maximum bandwidth credit accumulator value.

11. The method for reserving bandwidth in a WWFA of claim 8, further comprising:

upon the rate counter register reaching a predetermined value, generating a bandwidth credit for the bandwidth credit accumulator register and resetting the rate counter; and incrementing the bandwidth credit accumulator upon generating of the bandwidth credit if:

the request counter register is greater than or equal to the value of the bandwidth credit accumulator register; and the bandwidth credit accumulator register is less than a predetermined maximum bandwidth credit accumulator value.

12. The method for reserving bandwidth in a WWFA of claim 8, wherein said generating the bandwidth credit utilizes a reserved bandwidth credit generator selected from a floating point reserved bandwidth credit generator and a fixed point reserved bandwidth credit generator, the reserved bandwidth credit generator includes said rate counter register and said reserved bandwidth weight register.

13. The method for reserving bandwidth in a WWFA of claim 1, wherein each virtual link supports a high priority and a low priority and wherein each priority of each virtual link is associated with a virtual output queue, further comprising:
mapping continuous bit rate (CBR) and real time variable bit rate (rt-VBR) ATM service categories to the high priority virtual output queues associated with the WWFA; and
mapping non-real time variable bit rate (nrt-VBR), unspecified bit rate (UBR), and guaranteed frame rate (GFR) ATM service categories to the low priority virtual output queues associated with the WWFA.

14. The method for reserving bandwidth in a WWFA of claim 13, further comprising:
assigning a predetermined level of reserved bandwidth to a reserved bandwidth weight register,
the predetermined level of reserved bandwidth associated with the high priority virtual output queue is based upon peak cell rates (PCRs) of any CBR connections within the corresponding virtual link and the sustainable cell rates (SCRs) and the PCRs of any rt-VBR connections within the corresponding virtual link, and
the predetermined level of reserved bandwidth associated with the low priority virtual output queue is based upon the SCRs of any nrt-VBR connections within the corresponding virtual link, any minimum cell rate defined for any UBR connections within the corresponding virtual link, and the minimum cell rates (MCRs) of any GFR connections within the corresponding virtual link.

15. The method for reserving bandwidth in a WWFA of claim 1, further comprising:
buffering an output for a virtual link corresponding to the arbitration unit granted bandwidth as a result of the bandwidth arbitration passes, if any, the output being buffered into an output buffering queue associated with the output port corresponding to the virtual link.

16. The method for reserving bandwidth in a WWFA of claim 15, further comprising granting more than one request for bandwidth for an output port as a result of the bandwidth arbitration passes, wherein at most one granted request for each output port is for transfer to the output port and any non-transferred granted request is for buffering in the output buffering queue.

17. The method for reserving bandwidth in a WWFA of claim 16, wherein each virtual link supports a plurality of priorities and each output port is associated with a plurality of output buffering queues each associated with one of the priorities, further comprising scheduling buffered outputs from the plurality of output queues to each output port.

18. A communications switch with bandwidth reservation, the communications switch comprising:
a wrapped wave front wrapped arbiter (WWFA) with bandwidth reservation to arbitrate bandwidth of a given priority among the virtual links between input and output ports associated with the WWFA, each virtual link supporting one or more priorities, and each virtual link corresponding to an arbitration unit of the WWFA, the WWFA being configured to:
perform during a cell period at least one bandwidth arbitration pass of a wave front of the WWFA wherein arbitration units having a reserved bandwidth request of a given priority and reserved bandwidth credit of the given priority compete for the bandwidth associated with the wave front, and wherein arbitration units not having a reserved bandwidth request of the given priority and reserved bandwidth credit of the given priority do not compete for the bandwidth associated with the wave front; and
perform during said cell period at least one subsequent bandwidth arbitration pass of the wave front wherein arbitration units having a reserved bandwidth request of the given priority compete for the bandwidth associated with the wave front.

19. The communications switch of claim 18, wherein the WWFA is further configured to grant a first set of requests for bandwidth, if any, as a result of the at least one bandwidth arbitration pass, each grant of the first set of grants being associated with a different output port and to grant a second set of requests for bandwidth, if any, as a result of the at least one subsequent bandwidth arbitration pass, each grant of the second set of grants being associated with a different output port selected from output ports ungranted after the first granting, if any.

20. The communications switch of claim 18, wherein each virtual link supports only one priority.

21. The communications switch of claim 18, wherein each virtual link supports a high priority and a low priority.

22. The communications switch of claim 21, wherein the WWFA is configured to perform four bandwidth arbitration passes for each wave front, wherein:
during a first pass only arbitration units having high priority reserved bandwidth credit and a high priority bandwidth request compete for the bandwidth associated with the wave front;
during a second pass arbitration units having high priority reserved bandwidth credit and a high priority bandwidth request and arbitration units having low priority reserved bandwidth credit and a low priority bandwidth request compete for the bandwidth associated with the wave front;
during a third pass arbitration units having a high priority bandwidth request and arbitration units having low priority reserved bandwidth credit and a low priority bandwidth request compete for the bandwidth associated with the wave front; and
during a fourth pass arbitration units having at least one bandwidth request compete for the bandwidth associated with the wave front.

23. The communications switch of claim 22, wherein the WWFA is further configured such that within a given arbitration unit,
a high priority bandwidth request with a high priority reserved bandwidth credit has priority for the bandwidth over a low priority bandwidth request with a low priority reserved bandwidth credit, if the low priority bandwidth request with low priority reserved bandwidth credit is eligible to compete for the bandwidth,
a low priority bandwidth request with a low priority reserved bandwidth credit has priority for the bandwidth over a high priority bandwidth request without high priority reserved bandwidth credit, if the high priority bandwidth request without high priority reserved bandwidth credit is eligible to compete for the bandwidth, and a high priority bandwidth request without high priority reserved bandwidth credit has priority for the bandwidth over a low priority bandwidth request without low priority reserved bandwidth credit, if the low priority bandwidth request without low priority reserved bandwidth credit is eligible to compete for the bandwidth.

24. The communications switch of claim 18, wherein the WWFA further includes, for each priority of each virtual link, a bandwidth credit accumulator register to indicate the level of remaining reserved bandwidth credit, if any, a reserved bandwidth weight register to indicate a predetermined level of reserved bandwidth, a request counter register to track the number of bandwidth requests, and a rate counter register to generate reserved bandwidth credits for the bandwidth credit accumulator register.

25. The communications switch of claim 24, wherein the WWFA is configured to periodically increment the rate counter register at a frequency that is dependent upon the value of the weight register.

26. The communications switch of claim 25, wherein the WWFA further includes, for each priority of each virtual link, a burst register having a predetermined value to limit value of the bandwidth credit accumulator register.

27. The communications switch of claim 26, wherein the WWFA is further configured to:
upon the rate counter register reaching a predetermined value, generate a bandwidth credit for the bandwidth credit accumulator register and reset the rate counter; and
increment the bandwidth credit accumulator upon generating of the bandwidth credit if:
the value of the request counter register plus the value of the burst register is greater than the value of the bandwidth credit accumulator register; and
the bandwidth credit accumulator register is less than a predetermined maximum bandwidth credit accumulator value.

28. The communications switch of claim 25, wherein the WWFA further includes, for each priority of each virtual link, a reserved bandwidth credit generator to generate a reserved bandwidth credit, the reserved bandwidth credit generator being selected from a floating point reserved bandwidth credit generator and a fixed point reserved bandwidth credit generator, the reserved bandwidth credit generator includes the rate counter register and the reserved bandwidth weight register.

29. The communications switch of claim 25, wherein the WWFA is further configured to:
upon the rate counter register reaching a predetermined value, generate a bandwidth credit for the bandwidth credit accumulator register and reset the rate counter; and
increment the bandwidth credit accumulator upon generating of the bandwidth credit if:
the value of the request counter register is greater than or equal to the value of the bandwidth credit accumulator register; and
the bandwidth credit accumulator register is less than a predetermined maximum bandwidth credit accumulator value.

30. The communications switch of claim 18, further comprising an output buffering queue associated with each output port, the output buffering queue is adapted to buffer an output for a virtual link corresponding to the arbitration unit, if any, granted bandwidth for the corresponding output port as a result of the bandwidth arbitration passes.

31. The communications switch of claim 30, wherein the WWFA is further configured to grant more than one request for bandwidth for an output port as a result of the bandwidth arbitration passes, wherein at most one granted request for each output port is for transfer to the output port and any non-transferred granted request is for buffering in the output buffering queue.

32. The communications switch of claim 31, wherein each virtual link supports a plurality of priorities and each output port is associated with a plurality of output buffering queues each associated with one of the priorities, and wherein the WWFA is further configured to schedule buffered outputs from the plurality of output queues to each output port.

33. The communications switch of claim 18, wherein each virtual link supports a high priority and a low priority and wherein each priority of each virtual link is associated with a virtual output queue, and wherein the WWFA is further configured to map continuous bit rate (CBR) and real time variable bit rate (rt-VBR) ATM service categories to the high priority virtual output queue and to map non-real time variable bit rate (nrt-VBR), unspecified bit rate (UBR), and guaranteed frame rate (GFR) ATM service categories to the low priority virtual output queue.

34. The communications switch of claim 33, wherein the WWFA is further configured to assign a predetermined level of reserved bandwidth to a reserved bandwidth weight register associated with each priority of each virtual link,
the predetermined level of reserved bandwidth for the high priority virtual output queue being based upon peak cell rates (PCRs) of any CBR connections within the corresponding virtual link and the sustainable cell rates (SCRs) and the PCRs of any rt-VBR connections within the corresponding virtual link, and
the predetermined level of reserved bandwidth for the low priority virtual output queue being based upon the SCRs of any nrt-VBR connections within the corresponding virtual link, any minimum cell rate defined for any UBR connections within the corresponding virtual link, and the minimum cell rates (MCRs) of any GFR connections within the corresponding virtual link.

* * * * *